(12) United States Patent
Salesin et al.

(10) Patent No.: US 7,129,948 B2
(45) Date of Patent: *Oct. 31, 2006

(54) METHODS AND SYSTEMS FOR HINTING FONTS

(75) Inventors: David Salesin, Seattle, WA (US);
Geraldine Wade, Redmond, WA (US);
Douglas E. Zongker, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 186 days.

This patent is subject to a terminal disclaimer.

(21) Appl. No.: 10/782,255

(22) Filed: Feb. 19, 2004

(65) Prior Publication Data

US 2004/0160444 A1    Aug. 19, 2004

Related U.S. Application Data

(63) Continuation of application No. 09/620,618, filed on Jul. 21, 2000, now Pat. No. 6,760,028.

(51) Int. Cl.
*G06T 11/00* (2006.01)

(52) U.S. Cl. .................. 345/469; 345/471; 345/619

(58) Field of Classification Search ........ 345/467–472; 358/1.11, 1.15, 400
See application file for complete search history.

(56) References Cited

U.S. PATENT DOCUMENTS 5,155,805 A * 10/1992 Kaasila ................ 345/469
5,577,183 A * 11/1996 Weyand ............... 358/1.15
5,982,387 A * 11/1999 Hellmann ............. 345/469
6,760,028 B1 * 7/2004 Salesin et al. ......... 345/469

OTHER PUBLICATIONS

Hersch et al., "Electronic Publishing, Artistic Imaging, and Digital Typography", 7th International Conference on Electronic Publishing, EP'98, St. Malo, France, Mar. 30-Apr. 3, 1998 Proceedings, 11 pages.
Sederberg, "Computer Graphics", A publication of ACM SIGGRAPH, vol. 25, No. 4, Jul. 1991, 12 pages.

* cited by examiner

Primary Examiner—Mark Zimmerman
Assistant Examiner—Jwalant Amin
(74) Attorney, Agent, or Firm—Lee & Hayes, PLLC

(57) ABSTRACT

Methods and systems for automatically hinting fonts, particularly TrueType fonts, by transferring hints from one font to another are described. In one embodiment, a character or glyph (i.e. a source character) from a first font is selected and provides hints that are to be transferred to a character or glyph of a second font (i.e. a target character). The hints comprise statements defined in terms of control points or knots that define the shape or appearance of a character. A match is found between individual control points on the different characters and then used as the basis for transferring the hints. In one embodiment, hints are transferred by modifying values in a control value table (CVT) that contains entries that are used to constrain the control points of the source character. The CVT values are modified so that they now constrain corresponding control points in the target character.

42 Claims, 20 Drawing Sheets

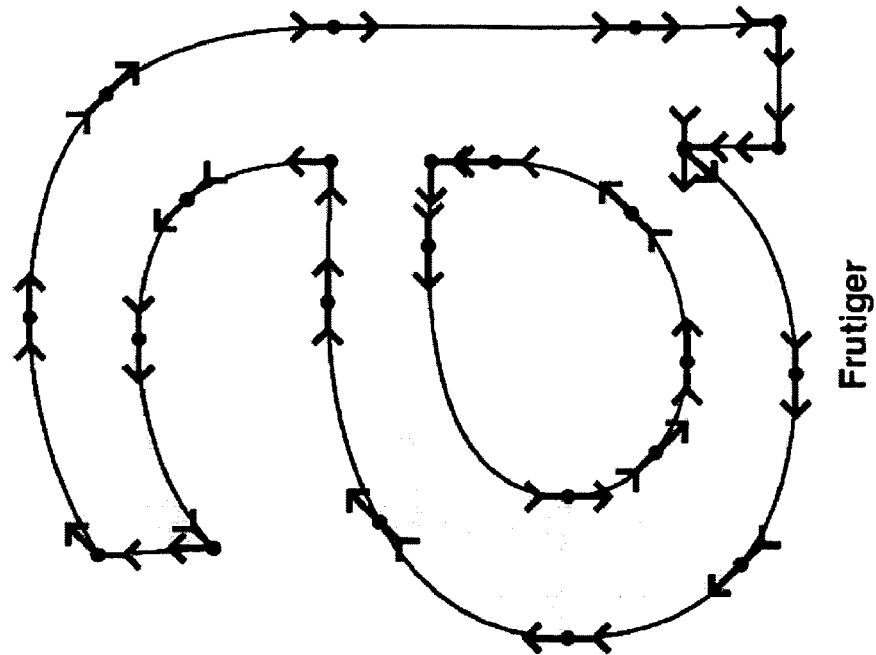
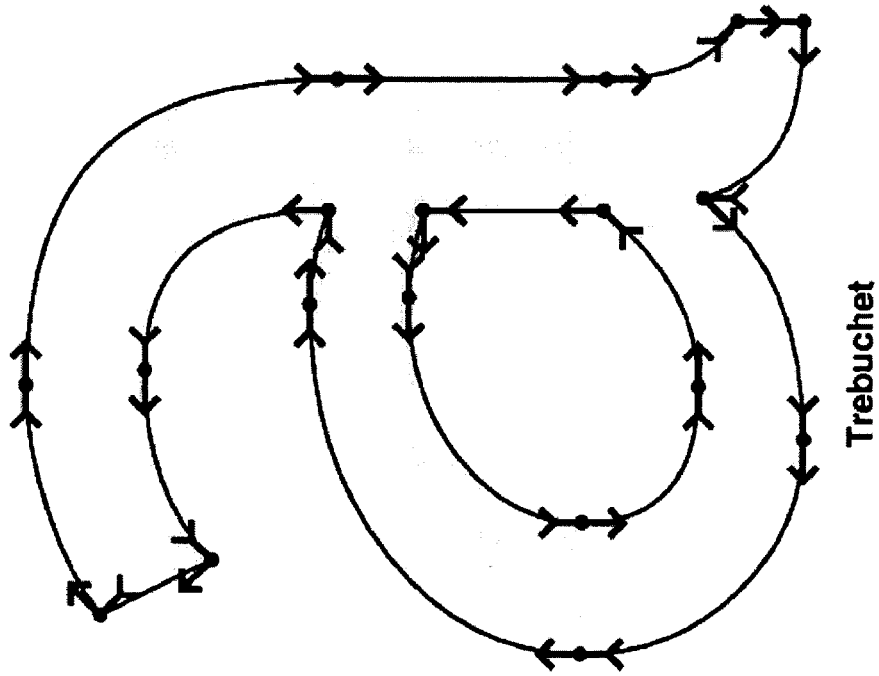
Fig. 6

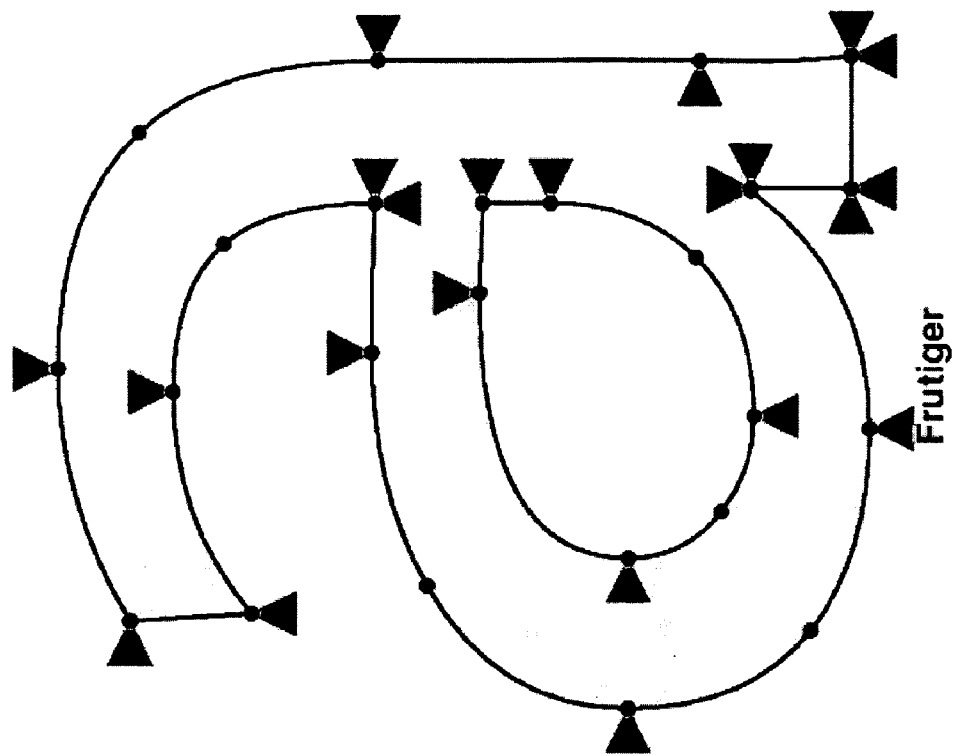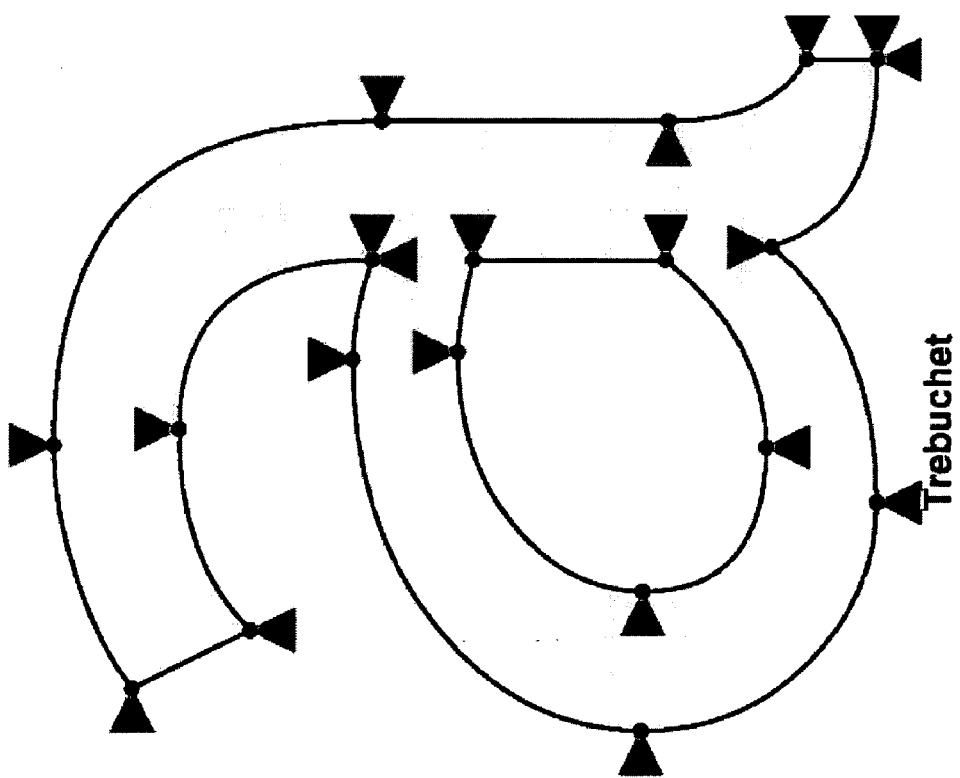
Fig. 7

16 ppem (12 point @ 96 dpi)
HHOHOHOOOOOOO123 five boxing wizards jumped quickly   unhinted
HHOHOHOOOOOOO123 five boxing wizards jumped quickly   autohinted
17 ppem (13 point @ 96 dpi)
HHOHOHOOOOOOOO123 five boxing wizards jumped quickly   unhinted
HHOHOHOOOOOOOO123 five boxing wizards jumped quickly   autohinted
19 ppem (14 point @ 96 dpi)
HHOHOHOOOOOOOO123 five boxing wizards jumped quickly   unhinted
HHOHOHOOOOOOOO123 five boxing wizards jumped quickly   autohinted

*Fig. 20*

16 ppem (12 point @ 96 dpi)
HHAHOHOAOOAOOAAA123 five boxing wizards jumped quickly   unhinted
HHAHOHOAOOAOOAAA123 five boxing wizards jumped quickly   autohinted
17 ppem (13 point @ 96 dpi)
HHAHOHOAOOAOOAAA123 five boxing wizards jumped quickly   unhinted
HHAHOHOAOOAOOAAA123 five boxing wizards jumped quickly   autohinted
19 ppem (14 point @ 96 dpi)
HHAHOHOAOOAOOAAA123 five boxing wizards jumped quickly   unhinted
HHAHOHOAOOAOOAAA123 five boxing wizards jumped quickly   autohinted

*Fig. 21*

METHODS AND SYSTEMS FOR HINTING FONTS

RELATED APPLICATION

This application is a continuation of and claims priority to U.S. patent application Ser. No. 09/620,618, filed on Jul. 21, 2000, now U.S. Pat. No. 6,760,028, the disclosure of which is incorporated by reference.

TECHNICAL FIELD

This invention relates to methods and systems for hinting fonts, particularly TrueType fonts.

BACKGROUND

The demand for high-quality hinted fonts is outstripping the ability of digital typography houses to produce them. Hinting is a painstaking manual process that can only be done well by a handful of highly skilled professionals. It requires a blend of typographical artistry with technological ability. In order to provide a full appreciation of the hinting problem, a review of how digital fonts are scan-converted onto a raster display is given.

In digital typography, each character in a font is described by a set of outlines, usually represented by splines. When the character is rendered onto a grid of pixels, the outlines are scaled to the desired size, and then each pixel whose center lies inside of an outline is set to black. When fonts are displayed at sufficiently high resolutions, this approach works beautifully. But for sizes below about 150 ppem, severe aliasing problems can result when this naive outline filling process is applied, especially for delicate features such as serifs. As an aside, hinters express font sizes in pixels per em, or ppem. This measure counts the number of device pixels in the em of the font. In traditional typography, the em of a font was the height of the metal block of type. With digital typography, there is no actual metal block to measure, but the digital outlines are still expressed in coordinates relative to this hypothetical size. The point size of text refers to the size of its em expressed in points (a point is 1/72 of an inch). Thus, "12-point text" would correspond to 12 ppem on a 72 dpi screen, or 100 ppem on a 600 dpi printer.

FIG. 1 shows an example of the aliasing problems that can result when a naïve outline filling process is applied. Consider the leftmost image 100 in the form of a lower case letter "a" which represents an outline of the character that is to be filled. The centermost image 102 (absent the illustrated black pixels 102a) is generated by a naïve algorithm. This pixel pattern does not look much like a lowercase "a". A simple dropout control mechanism can be added to the fill algorithm to turn on additional pixels to preserve the character's topology. The resultant pixels that are turned on by the dropout control mechanism are shown in black at 102a. The rightmost image 104 illustrates the work of an experienced hinter. It will be observed that the pixel pattern has been subtly altered to both improve readability and better preserve the character of the original outline.

The hinting process is not just about optimizing individual characters. The hinter must balance the needs of a single glyph with the desire for consistency across all the characters of a font. It is important, for example, to ensure that all the vertical stems of a font are the same number of pixels wide at a given size. If the scaling and rounding process produces one-pixel-wide stems on some characters and two-pixel-wide stems on others, then a passage of text will look blotchy and be difficult to read. The goal of the hinter is to produce a smooth transition from very high sizes, where merely filling the outlines suffices and hinting is unnecessary, down to lower sizes, where legibility must be preserved even when that means a departure from the outlines drawn by the original font designer.

Although the ever-improving resolution of hardcopy devices is beginning to approach the point at which hinting is not necessary, the technology is not there yet: 10- or 12-point text on a 300 or even 600 dpi printer still needs hinting for best results. More importantly, the increasing emphasis on reading text on-screen—from visions of the "paperless office" to the emergence and proliferation of hand-held computers and eBooks—means that more and more text is being viewed on devices in the 72–100 dpi range. Though resolutions of these displays are improving as well, for the foreseeable future hinting will be an absolute necessity in order to provide clear, legible text.

Although attempts have been made to design automated hinting systems in the past, even the best of these produce hints that are good, but still not up to the standards of professional typographers. Exemplary systems are described in the following references: Andler, *Automatic generation of gridfitting hints for rasterization of outline fonts or graphics*, Proceedings of the International Conference on Electronic Publishing, Document Manipulation, and Typography, pps. 221–234, Sept. 1990, and Hersch, *Character generation under grid constraints*, Proceedings of SIGGRAPH 87, pps. 243–252, July 1987.

This previous work assumed that in order to be useful, an autohinter had to be a monolithic, self-contained package: outlines in, quality hints out. That is an admirable goal, and it may be achieved someday. However, given the detailed, aesthetically-based nature of the work, a better, more useful approach is to view the autohinter as one piece of a system that includes a human hinter.

There are two major font standards in widespread use today: Type 1 and TrueType. Type 1 fonts (Adobe Systems Inc., *Adobe Type 1 Font Format*, March 1990), often called "PostScript fonts," were developed by Adobe and are popular in the world of publishing. Printing applications were the target when this system was developed, though utilities are now available to enable on-screen display of Type 1 fonts. The TrueType format (Apple Computer, Inc., *The TrueType Font Format Specification*, 1990, Version 1.0), originally developed by Apple, was intended to unify type on the screen and on paper, and is used in both the Macintosh and Windows operating systems. TrueType has something of a reputation for being of low quality, but this is mostly due to the fact that TrueType was always an open standard while Type 1 was not, and so the public domain is flooded with a large number of poorly designed, unhinted TrueType fonts. The TrueType standard does contain extensive facilities for high-quality hinting, though, and through the efforts of Monotype and other typography houses, more and more quality fonts are now available in the TrueType format.

Though both formats represent characters as spline-based outlines, the hinting styles are radically different. Hinting for Type 1 fonts works by marking sections of the outline as corresponding to particular typographic features of the character—stems, bowls, counters, and so on. It is the job of the rasterizer to take advantage of these hints about the character shape to produce the best possible pattern of pixels. This scheme has the advantage that enhancements to the rasterizer can produce improvements to all fonts on the system, but means that a designer of digital type cannot specify exactly what an outline will look like when rendered at a given size.

The TrueType font technology takes a different approach. Instead of leaving control over the glyph's final appearance to the rasterizer, a TrueType font contains explicit instructions (hints) about how particular control points should be shifted to fit the pixel grid. These instructions take the form of a program in a special, TrueType-specific bytecode language. Since both the behavior of each instruction and the rasterizing algorithm are defined in the TrueType standard, the designer of a TrueType font can predict exactly which pixels will be turned on for a character at a given size, no matter what type of output device is being used.

In TrueType, each contour of an outline is specified with a sequence of point positions (also referred to herein as "control points" or "knots"). FIG. 2 shows exemplary outline curves of the lowercase letter "a" for two fonts: Trebuchet and Frutiger. Each point is flagged as either "on-curve" or "off-curve". TrueType defines the outline as follows:

Two successive on-curve points are connected with a straight line segment.

When an off-curve point falls between two on-curve points, the three are treated as the control points for a quadratic Bézier segment.

When two adjacent off-curve points appear, the midpoint of the segment connecting them is treated as an implicit on-curve point between them, allowing reduction to the case above.

The glyph renderer starts by scaling the outlines to a particular size, then executes the attached program to shift control points around in a size-specific way before filling the altered outline. By itself, this approach cannot produce the necessary consistency among different characters of a font, or even between different parts of the same character, since each action is necessarily local. Global synchronization of outline alterations is achieved through use of a control value table, or CVT. The CVT is a shared table of distances, that can be referenced by instructions in each glyph's program. When the rendering is initialized for a given size, the values in the CVT are scaled and rounded to the current grid size. Point movements can then be constrained by CVT entries. For instance, a person writing hints for TrueType may decide to use CVT 81 to represent, say, the width of vertical black stems in lowercase letters. He or she will then write instruction sequences for all appropriate lowercase letters, all referring to CVT entry 81, so that all the vertical black stems at a given size will have the same width.

The TrueType language is an assembly-style stack-based language. The intent of the designers of TrueType was not to make typographers learn and write in the TrueType language itself, but rather to facilitate the development of high-level languages and tools that generate TrueType code. The Visual TrueType (VTT) package from Microsoft is such a tool. VTT is described in detail in Stamm, *A Graphical Method for Authoring Font Intelligence*, Electronic Publishing, Raster Imaging, and Digital Typography, pps. 77–92, March/April 1998.

VTT provides a high-level language, called "VTT Talk", for expressing relationships between points. VTT Talk provides statements for expressing the following classes of hints:

Link constraints: the vertical or horizontal distance between a pair of knots is constrained by an entry in the CVT.

Dist constraints: the "natural" vertical or horizontal distance between a pair of knots is maintained, so that if one point is moved the other moves in parallel.

Interpolate constraints: a knot's fractional distance between two parent knots is maintained.

Anchors: specific knots can be rounded to the nearest gridline, or to a gridline specified by a CVT entry.

These types of hints are demonstrated visually for two characters from the Georgia Roman font in FIG. 3. There, the constraints are labeled for identification.

The VTT Talk hints are compiled into a TrueType program stored in the font file. One advantage of working with VTT Talk is that each statement simply asserts a relationship between two points, and there is little dependence on the order of the statements. If one statement is omitted, the meaning of the others is unchanged. In contrast, TrueType assembler is a sequential language that maintains a fairly complex state. Most instructions in TrueType have side effects that modify this state. If one tried to translate the assembler code directly, and were for some reason unable to translate a particular instruction—for instance, due to a sufficiently large difference in the matched glyphs' outlines—the effects of subsequent instructions could change entirely.

This invention arose out of concerns associated with improving the systems and methods through which hinting takes place. In particular, the invention arose out of concerns associated with improving TrueType hinting systems and tools.

SUMMARY

Methods and systems for hinting fonts, particularly TrueType fonts, are described. The inventive methods and systems provide a mechanism by which hints are automatically translated from one font to another. An advantageous feature of the described approach is that it preserves the basic strategy and structure of the original hints, which were handcrafted by a professional typographer for each individual glyph of the font. Generally, these translated hints provide an excellent starting point for a human typographer to fine-tune and adjust.

In the illustrated and described embodiment, a character or glyph (i.e. a source character) from a first font is selected and provides hints that are to be transferred to a character or glyph of a second font (i.e. a target character). The hints, in the described embodiment, are TrueType hints that are statements defined in terms of control points or knots that define the shape or appearance of a character. The hints constrain the character's control points, e.g. the distance between a pair of control points or how the points relate to one another. Outlines or contours for the two characters are first matched to establish a correspondence between the characters. Next, various attempts are made to find a "best match" between individual control points on the source character and target character.

In the illustrated and described embodiment, finding a best match between individual control points on the different characters involves a process by which control points on the source character are paired with different control points on the target character. Each pairing of control points is then scored in accordance with predefined criteria to provide a local feature score for each control point pair. The local feature score is a measure of how well the individual control points match. The local feature scores are then summed to provide an overall score of the set of paired control points. Different control point pairings are tried and result in multiple sets of paired control points. Each of the sets of paired control points has an overall score.

A predetermined number of the best overall scores are selected and then each overall score is attempted to be improved upon. This takes place by manipulating the individual control point pairings within each set that corresponds to an overall score, subject to a condition designed to preserve the order of the control points. The result of this process is a single score that reflects the best or most optimal pairing of control points.

Once a desirable pairing of control points is ascertained, hints from the source character can be translated to the target character. Advantageously, in the described embodiment, translation of the hints involves manipulating control point references in the defined hints so that the hints now refer to control points in the target character rather than control points in the source character. Because the most optimal pairing of control points was ascertained, this process is greatly facilitated.

In addition, the hints can contain references to a control value table (CVT). The CVT contains table entries that are associated with values that are used to constrain the control points of the source character. In accordance with one embodiment, CVT values are manipulated so that the entries now correspond to values that are used to constrain the character in the target font. Manipulating the CVT values recognizes that there are differences between the source and target characters and that using the values associated with the source character in connection with the target character would be inappropriate.

BRIEF DESCRIPTION OF THE DRAWINGS

FIGS. 6–8 illustrate different features that are utilized to ascertain a score for a pair of control points in accordance with the described embodiment.

FIG. 20 illustrates the Sylfaen Sans Bold font, both unhinted and with hints transferred from Sylfaen Sans Roman.

FIG. 21 illustrates the Georgia Bold font, both unhinted and with hints transferred from Georgia Roman.

DETAILED DESCRIPTION

Overview

Figure 1:
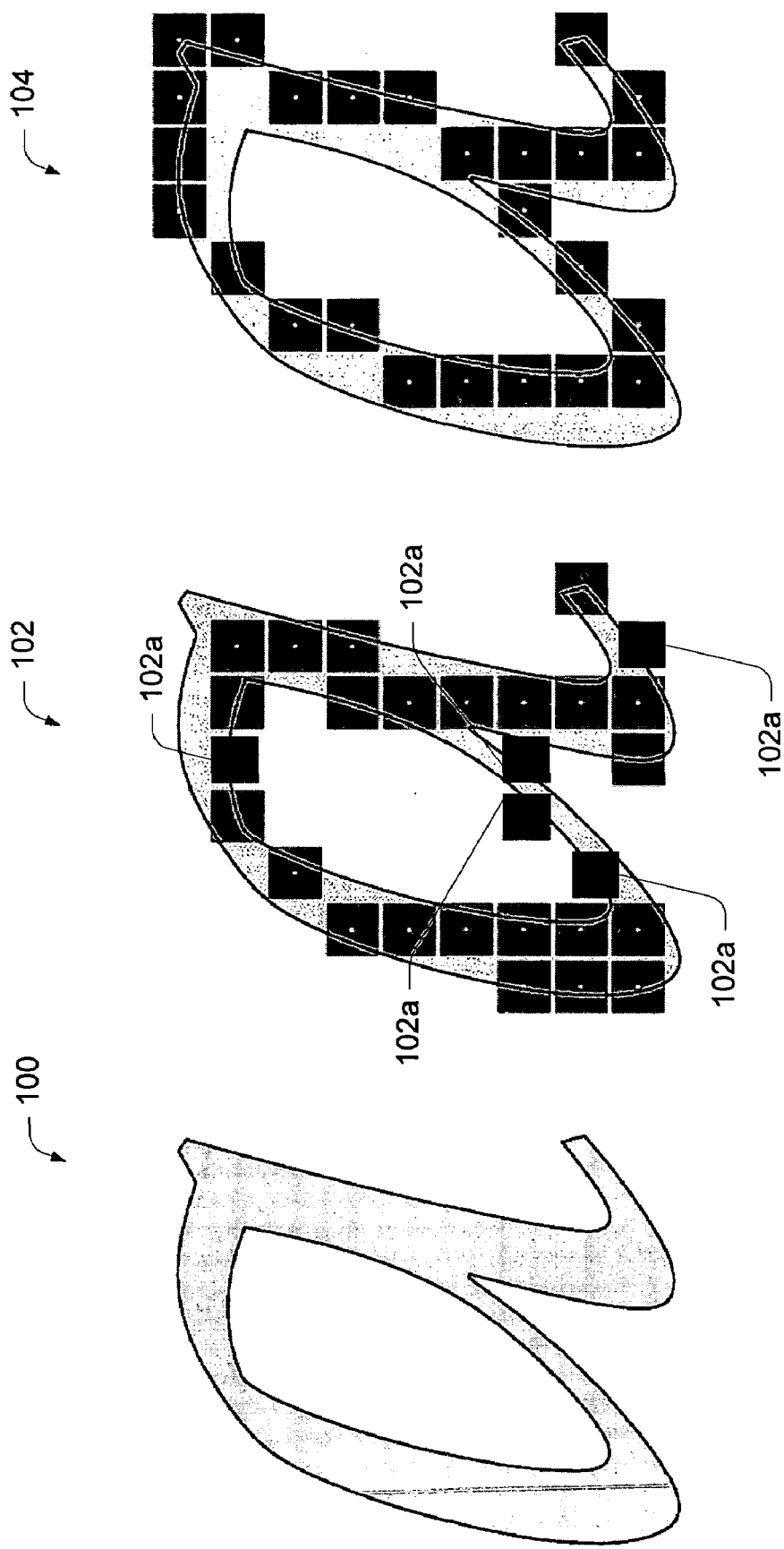
FIG. 1 illustrates outline for the Palatino Italic "a", along with a pixel pattern generated by rasterizing the outlines for display of 18-point text on a 72 dpi device.

The inventive approach described below was primarily motivated by the work of Hersch and Betrisey, see, e.g. Hersch and Betrisey, *Model-based Matching and Hinting of Fonts*, Proceedings of SIGGRAPH 91, pps. 71–80, July 1991. In that method, hints are generated for each glyph by matching its outline to a human-constructed generic model of that character's shape (for example, a generic uppercase roman 'B'). The model consists of two representations of the generic character shape. A skeleton model builds the character out of solid parts, labeled as stems, bowls, serifs, and so on. A contour model is an outline representation of the character, constructed to have as few control points as possible while still spanning the space of possible character shapes. The correspondences between the two models are known because they are specified by hand when the model is built. In their method, the outlines of the glyph to be hinted are matched to the corresponding contour model by a fairly complex process that takes into account both global and local features. Points are classified by their position relative to the baseline, cap-height and x-height lines, and left and right sidebearings. Local features distinguishing points are based on the curvature, direction, and orientation of the adjacent curve segments. Once the correspondence between the unknown outline and the model outline is established, the known correspondence between the model outline and the model skeleton can be used to label parts of the unknown outline as belonging to significant features such as stems and serifs. From this labeling a set of Type 1-style hints for the new outline can be derived.

Hersch and Betrisey's work requires a manually constructed model in order to link points on the outline with the "semantic" features needed for hinting. Hinting in TrueType does not require an explicit labeling of these features. Rather, this information is implicitly used by the human typographer when deciding on a hinting strategy for the character. The end result expressed in the font is simply a set of relationships, or constraints, between control points. These constraints obviate the need for the skeleton model— once we find the correspondence between a contour model and the outlines of the target glyph, hints can be immediately produced for the target outline without transitively applying a second correspondence.

In the inventive approach, we have reduced our needs to having a contour model with control-point-level hints attached to it. Advantageously, a TrueType font that has already been hinted is used as the contour model. This has a number of advantages over using a specialized model built expressly for the auto-hinter.

First, there are immediately a wide variety of fonts from which to choose as templates. Moreover, choosing a template close to the target font will increase the likelihood of a good match, and consequently the quality of the resulting hints. Advantageously, a template font can be selected from a library automatically, or within a typeface classification system, or different template fonts can be chosen for different characters of the target. Another advantage of using real hinted fonts as templates is that typographers, rather than computer scientists, can build templates using tools with which they familiar. Furthermore, each typographer can build templates to suit his or her hinting style.

Exemplary Computer System

Figure 4:
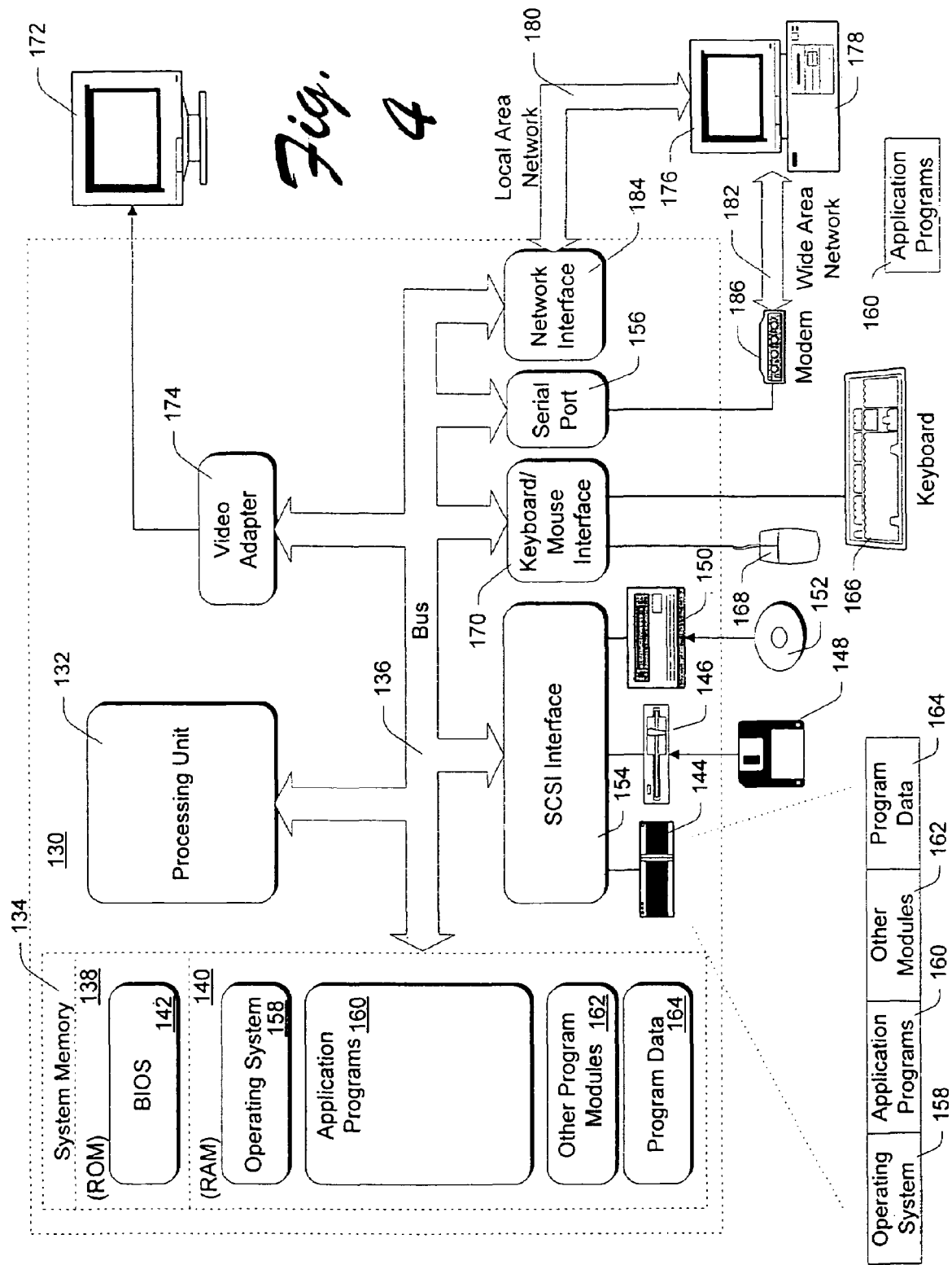
FIG. 4 is a high level diagram of a computer system that can be utilized to implement an autohinter in accordance with the described embodiment.

FIG. 4 is a high level block diagram of an exemplary computer system 130 that can be programmed to function as an automated hinting system referred to as an "autohinter".

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 4. The logical connections depicted in FIG. 4 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Processing Technique Overview

Figure 5:
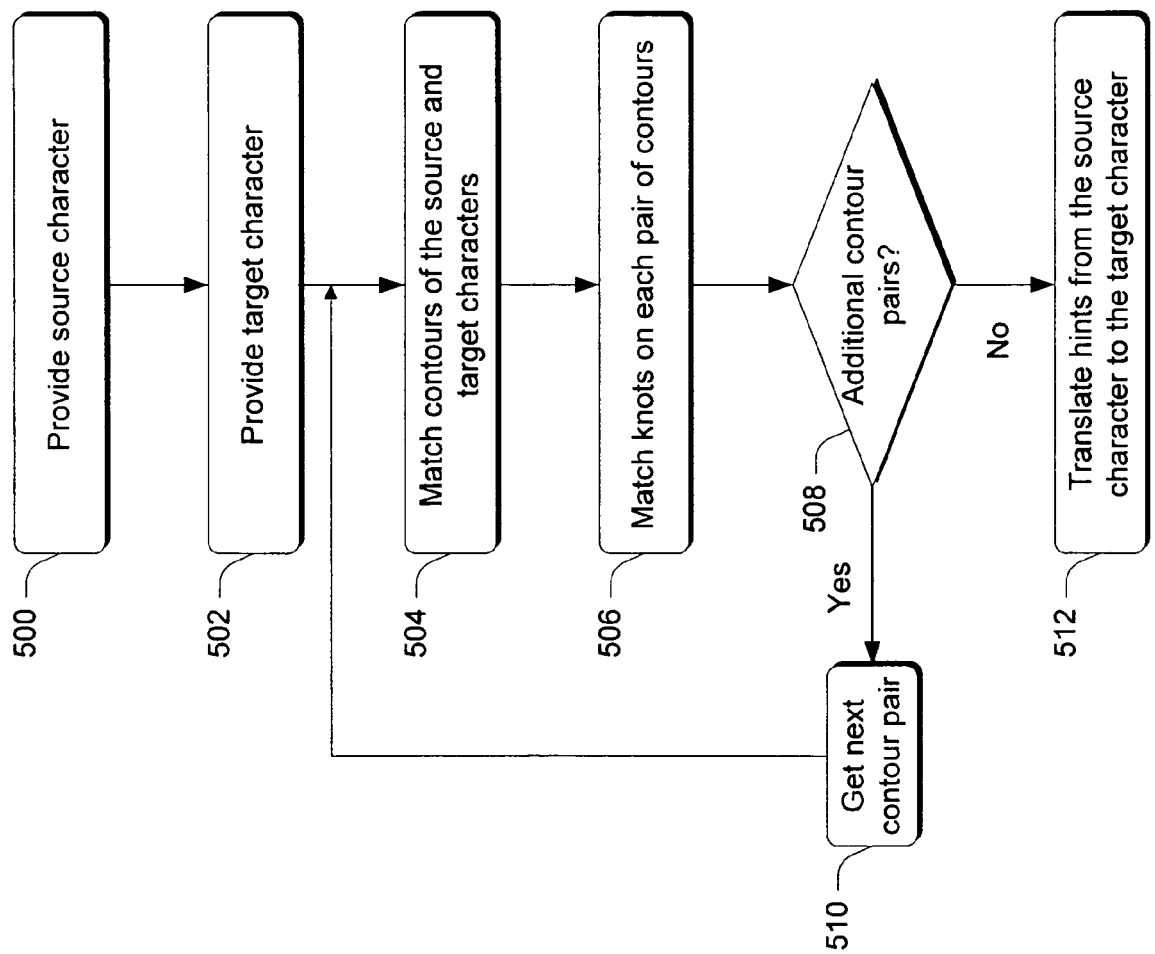
FIG. 5 is a flow diagram that describes steps in a method in accordance with the described embodiment.

FIG. 5 shows a flow diagram that describes steps in a processing method in accordance with the described embodiment. The method is advantageously implemented in software in connection with an automated programmed autohinter, although it could be implemented in any suitable hardware, software, firmware, or combination thereof.

Step 500 provides a source character from which hints are going to be translated or transferred. As was pointed out above, the source character is advantageously a character that has already been hinted. This constitutes a dramatic improvement in flexibility and processing time over other methods in which hints are not translated from previously-hinted fonts. Step 502 provides a target character to which the hints from the source character are to be translated or transferred. Step 504 matches contours or outlines of the source and target characters. The goal of this step is to identify and pair contours on the source and target characters that are like contours. For example, the lower case letter "a" has two contours—an inner contour (defining the enclosed inner area in the body of the letter) and an outer contour (defining the outer perimeter and hence shape of the letter). This step ensures that like contours from the source character and the target character are paired together. A specific example of one way of accomplishing this task is described in the section entitled "Matching the Outlines" below.

Once the contours are matched, step 506 attempts to match knots (i.e. control points) on one of the contours with knots on the other of the contours. Throughout this document, the terms "knots" and "control points" will be used interchangably. Recall that each contour is defined by or associated with a number of control points that are either on-curve or off curve. What this step attempts to do is to find a "best match" between the control points on the matched contour pair. In the illustrated and described embodiment, this step is accomplished by establishing quantifiable criteria and then examining and scoring knot pairs on the two contours. It will be appreciated that step 506 is performed a number of different times for each pair of matched contours. This produces, in turn, a quantified measurement that gives an indication of the desirability of a particular association of knots between the outlines. From these quantified measurements, a best measurement is selected as constituting the "best match" between the control points on the different outlines or contours. An example of one way of accomplishing this task is given below in the section entitled "Calculating a Score".

Step 508 then checks to see whether there are any additional contour pairs for evaluation. If there are, step 510 gets the next pair of contours and returns to step 506. If there are no additional contour pairs, then step 512 translates hints from the source character to the target character. An example of how this task can be accomplished is given below in the section entitled "Hint Translation".

Matching the Outlines

Referring back to FIG. 2, two glyphs 200, 202 are shown and represent a single character—lowercase "a". Within this document, the terms "glyphs" and "characters" are used interchangably.

Glyph 200 constitutes a source character in the Trebuchet font which has already been hinted and from which hints are to be transferred. Glyph 202 constitutes a target character in the Frutiger that has not been hinted and to which hints from glyph 200 are to be transferred. In this particular example, each glyph has two outlines or contours that are to be matched. The outlines for source character 200 are shown at 200*a*, 200*b* and the outlines for target character 202 are shown at 202*a*, 202*b*.

A primary goal of the process described below is to translate hints that refer to control points on the source character or outline to hints that refer to control points on the target character or outline. As indicated above, control points for the two characters are indicated as either a solid dot (to indicate on-curve control points or knots) or an open dot (to indicate off-curve control points or knots).

The algorithmic approach described below attempts to match up explicit on-curve knots using features such as contour direction and the presence of extrema. The on-curve knots typically have far more significance to the shape and extents of the contour. Once a match is computed between the on-curve knots, an attempt is made to pair up the remaining knots by simply counting the number of off-curve knots between each pair of matched on-curve knots. If the numbers are equal, then the off-curve knots are paired based solely on their order. Only a very small fraction of hints involve these off-curve knots, but this is done to preserve as many of the source hints as possible.

Many glyphs are defined by multiple contours, but there are no restrictions on what order the contours are listed in. Therefore, a first task is to determine which contour goes with which in the two glyphs. In the illustrated example, this is done by enumerating all the possibilities for a one-to-one pairing of the contours. (The hinter rejects input outline pairs with differing numbers of contours). A score is calculated for each pairing as follows. Suppose that the target character is scaled and translated so that its bounding box is equal to that of the source character. For each individual contour within the characters, a sum is computed of the absolute values of the differences between corresponding sides of the contour bounding boxes. This value, summed over all the contours, gives the score for the match, with the lowest value being the best match. Of course, other methods could be used without departing from the spirit and scope of the claimed subject matter.

Knot Matching

After the outlines or contours have been matched, an attempt is made to match the knots or control points on each of the outlines so that a basis for transferring hints can be established.

In the illustrated example, this is done by pairing individual control points on the outlines, and evaluating the point pairs in accordance with established criteria to ascertain a score that rates their match. Although any suitable criteria can be used, in the illustrated example the criteria take the following form, each of which is explained in more detail below: (1) incoming and outgoing direction, (2) local minimum or maximum, (3) incoming and outgoing lines straight or curved, and (4) band matches.

The pairing of the individual control points on the outlines defines a single set of multiple control point pairs. The process is repeated multiple times so that multiple sets are defined. A score is calculated for each set and a set that has the best overall score is selected as a basis for transferring the hints.

Incoming/Outgoing Direction

Figure 2:
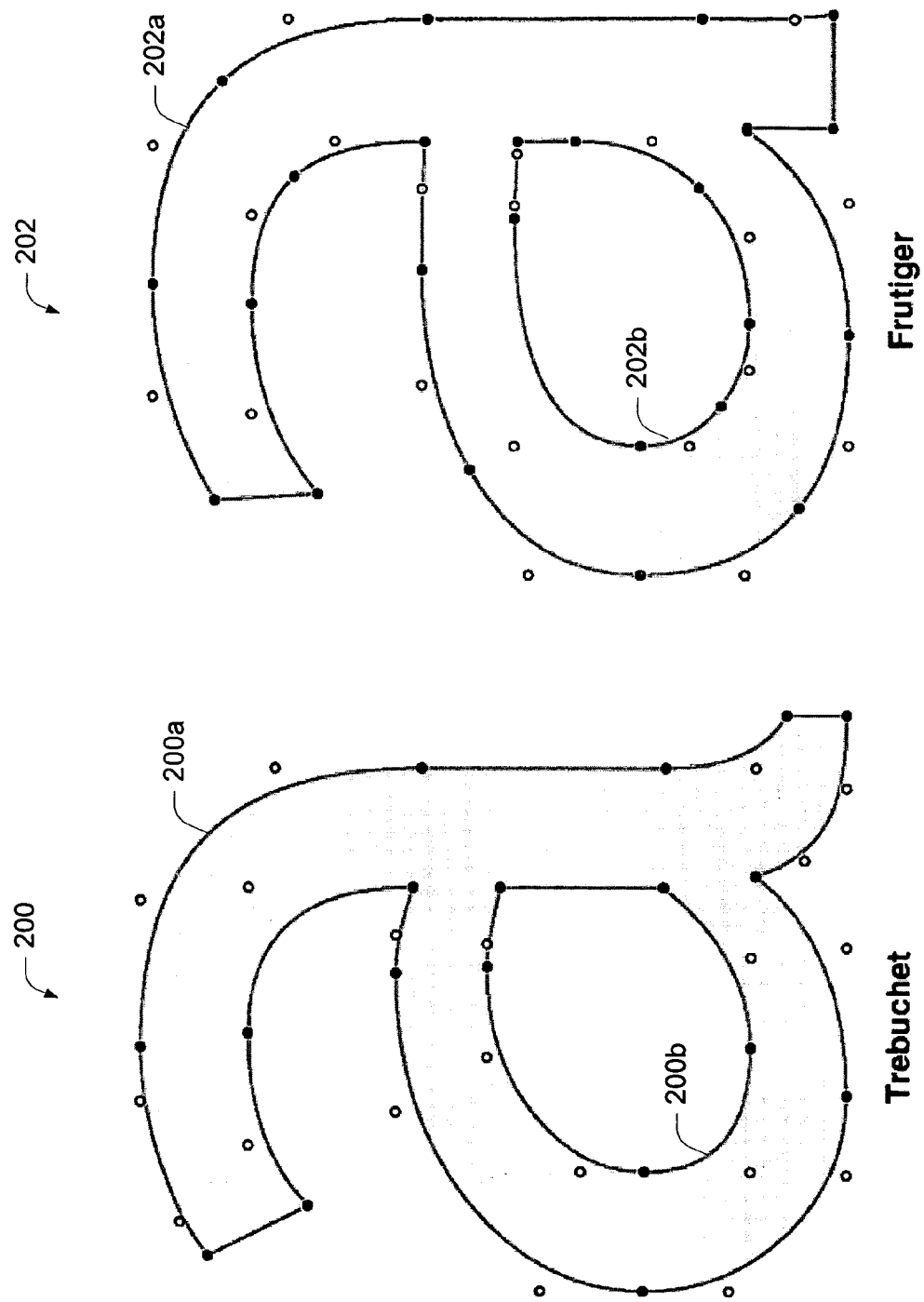
FIG. 2 illustrates, for two different TrueType fonts, various "on-curve" and "off-curve" control points that are used to define hints for the fonts.
Figure 3:
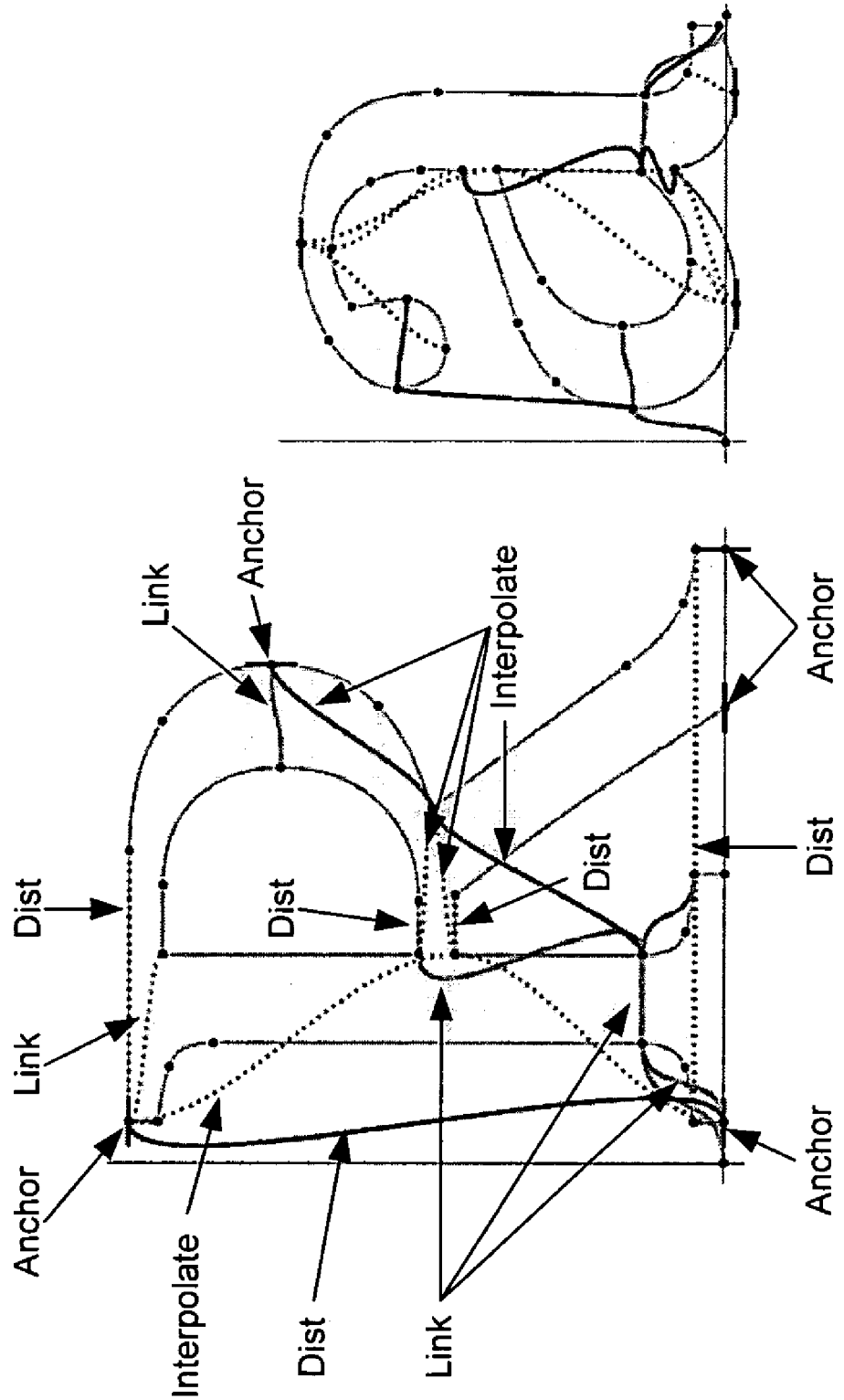
FIG. 3 illustrates a visualization of VTT Talk hints created by a professional hinter for two characters of Georgia Roman.

FIG. 6 shows the characters of FIG. 2 highlighted in a manner that illustrates a first feature that is used for ascertaining a score for a match between control points—incoming/outgoing direction. Specifically, each knot or control point has an incoming and an outgoing direction associated with it. The direction is based on the tangents of the curves touching that knot or control point.

In the illustrated example, a clockwise convention is used and the directions are indicated by the arrows that are either pointed toward or away from any one knot. The direction is quantitized to one of eight possibilities, corresponding to the eight compass directions, e.g. north, northeast, east, southeast, south, southwest, west, and northwest. A pair of knots on the two characters is assigned from 200 to −200 points based on the similarity of each direction. For example, a knot with an incoming direction of "north," gets 200 points when matched with another "north" knot, 100 points for a "northeast" or "northwest" match, 0 points for "east" or "west", −100 points for "southeast" or "southwest", and −200 points for matching a "south" knot. This score is calculated for both the incoming and outgoing direction.

Local Minimum or Maximum

FIG. 7 shows the characters of FIG. 2 highlighted in a manner that illustrates a second feature that is used for ascertaining a score for a match between control points—local minimum or maximum. Specifically, each knot can be flagged as a local minimum or maximum in each of the x or y directions. A knot with one of these flags will contribute 150 points when matched with a knot with the same flag, or −150 points when matched to the opposite flag. In the FIG. 7 illustration, local extrema are indicated by the triangles at each of the appropriate knots. A knot may not be an extremum at all in a given direction, in which case any match will not produce a score for this category.

Incoming and Outgoing Lines Straight or Curved

Figure 8:
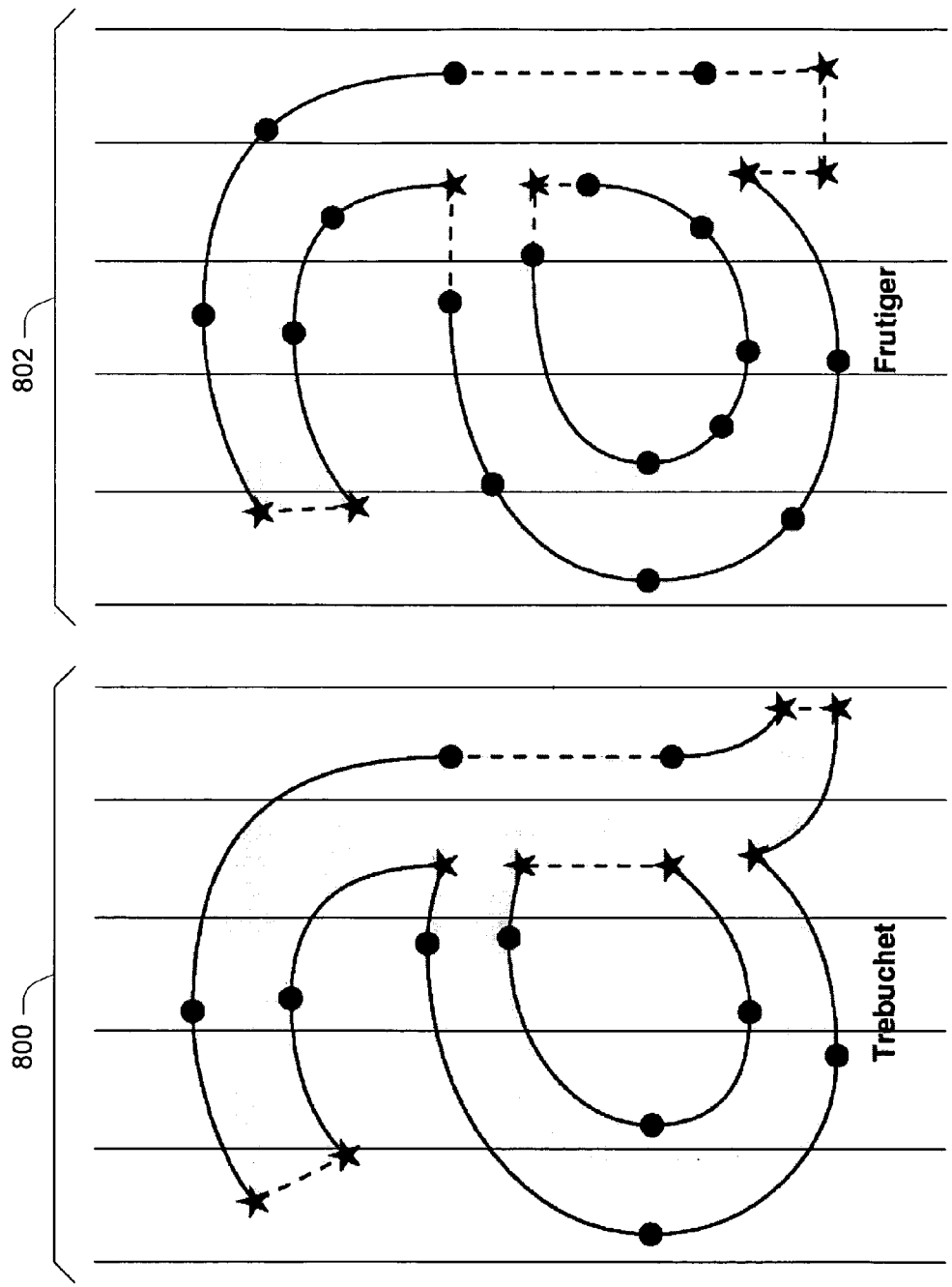

FIG. 8 shows the characters of FIG. 2 highlighted in a manner that illustrates a third feature that is used for ascertaining a score for a match between control points— incoming and outgoing lines straight or curved. Specifically, each knot has a flag to indicate whether the incoming and outgoing lines are straight (within some tolerance) or curved. In the illustrated example, curved incoming or outgoing lines are indicated as solid lines, while straight incoming or outgoing lines are indicated as dashed lines. Matching these flags produces a score of 100 points, but not matching them produces no penalty.

Band Matches

Another feature that is utilized to ascertain a score for a match between control points is referred to as "band matches". Here, the vertical and horizontal extents of a particular contour are divided into a number of equally spaced bands, e.g. five bands. Corresponding knots on the different contours are given a score of 400 points if they fall into the same band, and 200 points if they fall into an adjacent band. Any other distribution does nothing to the score. This process is carried out twice for each contour—once for the horizontal direction and once for the vertical direction. Consider again FIG. 8. There, two different band groupings 800, 802 are shown that might be used to assess the horizontal extents of each 11 contour. Accordingly, this feature assesses the desirability of a match by considering whether each control point of a pair falls into one of a plurality of common bands that are defined for each character.

Generating the Matches

Figure 9:
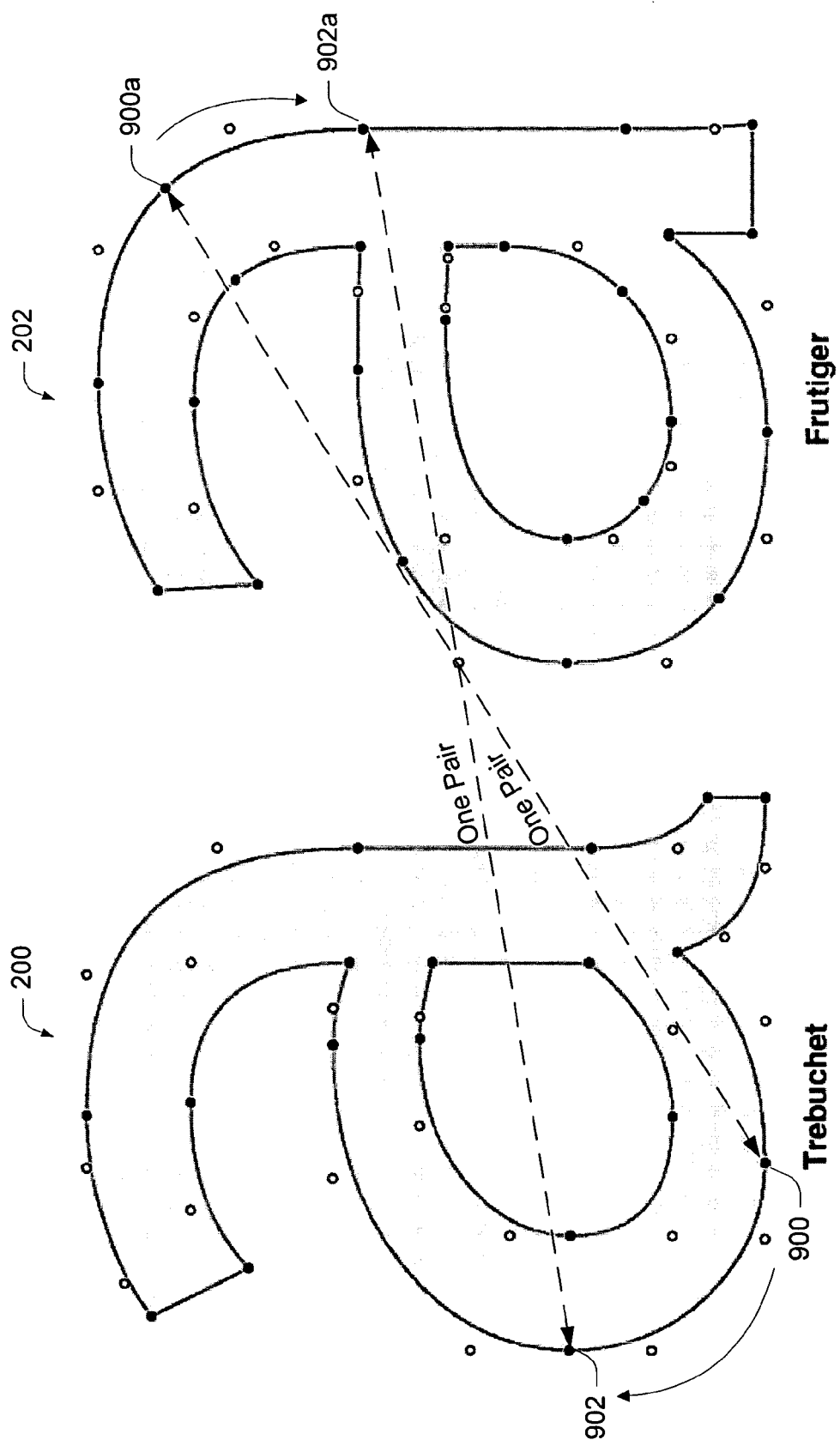
FIG. 9 illustrates one way in which control points can be paired for purposes of generating a score.

FIG. 9 shows the characters of FIG. 2 and will assist in understanding an exemplary pairing and matching process in accordance with the described embodiment.

To generate knot pairs (control point pairs), an arbitrary starting knot on each contour to be matched is selected and then paired together. For example, consider that the outer contour for each character 200, 202 is undergoing a knot-pairing process. The starting knot on the outer contour for character 200 might be knot 900, while the starting knot on the outer contour for character 202 might be 900a. These two knots constitute one pair of knots.

After the starting knots are selected, the other knots on the source and target outline are paired in a predetermined manner. This defines multiple knot pairs that collectively define one set of knot pairs. In the illustrated example, the pairing takes place by moving, in a defined direction, around the source contour to the next knot, and pairing each knot with the knot on the target contour whose fractional arc length relative to the starting knot is closest to that of the source knot. In the illustrated example, this next pairing might constitute knots 902, 902a. This process is repeated for all of the knots on the source contour until all source knots are paired up with a corresponding target knot. This pairing of all of the source knots generates the set of knot pairs.

A local feature score is calculated for each pair of knots, e.g. a local feature score is calculated for pairs 900–900a, 902–902a, etc. One example of how this can be done is given above. Once all of the local feature scores are calculated for all of the knot pairs, the scores are summed to provide an overall score that rates the quality of the overall match of the contours.

In the present example, it will be appreciated that the selected starting points on the source and target outline (i.e. points 900, 900a) would not generate a score that reflects a high quality match. This is because point 900 is located on the bottom portion of the character and point 900a is located on the top portion of the character and thus, these points do not have much in common. Thus, these particular pairings of source and target knots is not the most optimal.

A different set of knot pairings is now generated and evaluated as described above. In the illustrated example, this can be done by maintaining the starting knot on the source contour (i.e. knot 900) and moving to a different starting knot on the target contour (e.g. knot 902a). The pairing process for each knot on the source contour is repeated as described above so that all of the source knots are paired. For each pair of knots, a local feature score is calculated, and all of the local feature scores are summed to rate the quality of the overall match.

This process is repeated so that every knot on the target contour is used as a starting knot for purposes of computing a local feature score.

The output of this process provides multiple sets of knot pairs and each set has a score that is calculated as described above. In the illustrated example, the number of scores will be equal to the number of knots on the target outline because each target knot is used as a starting knot for a set of knot pairings.

The set of scores is reduced by selecting the five matches with the highest summed local-feature scores. Each of the scores of the reduced set of scores is then further processed to attempt to improve it. This is done by manipulating the individual knot pairings of the set that generated a particular score. Specifically, pairings between knot pairs that generated a negative local-feature score are removed so that the knots are not paired together. Then, unpaired source knots are attempted to be paired with other target knots. Additionally, existing knot pairs are shifted to adjacent target knots. All of this processing is subject to the constraint that the knot match respect the ordering of knots around the contour: e.g., if knot B follows knot A in the source contour, then the partner of knot B should not come before the partner of knot A on the target contour.

Once this local improvement processing has been conducted on each of the five top matches, the match with the highest final score is selected as the final match.

Figure 10:
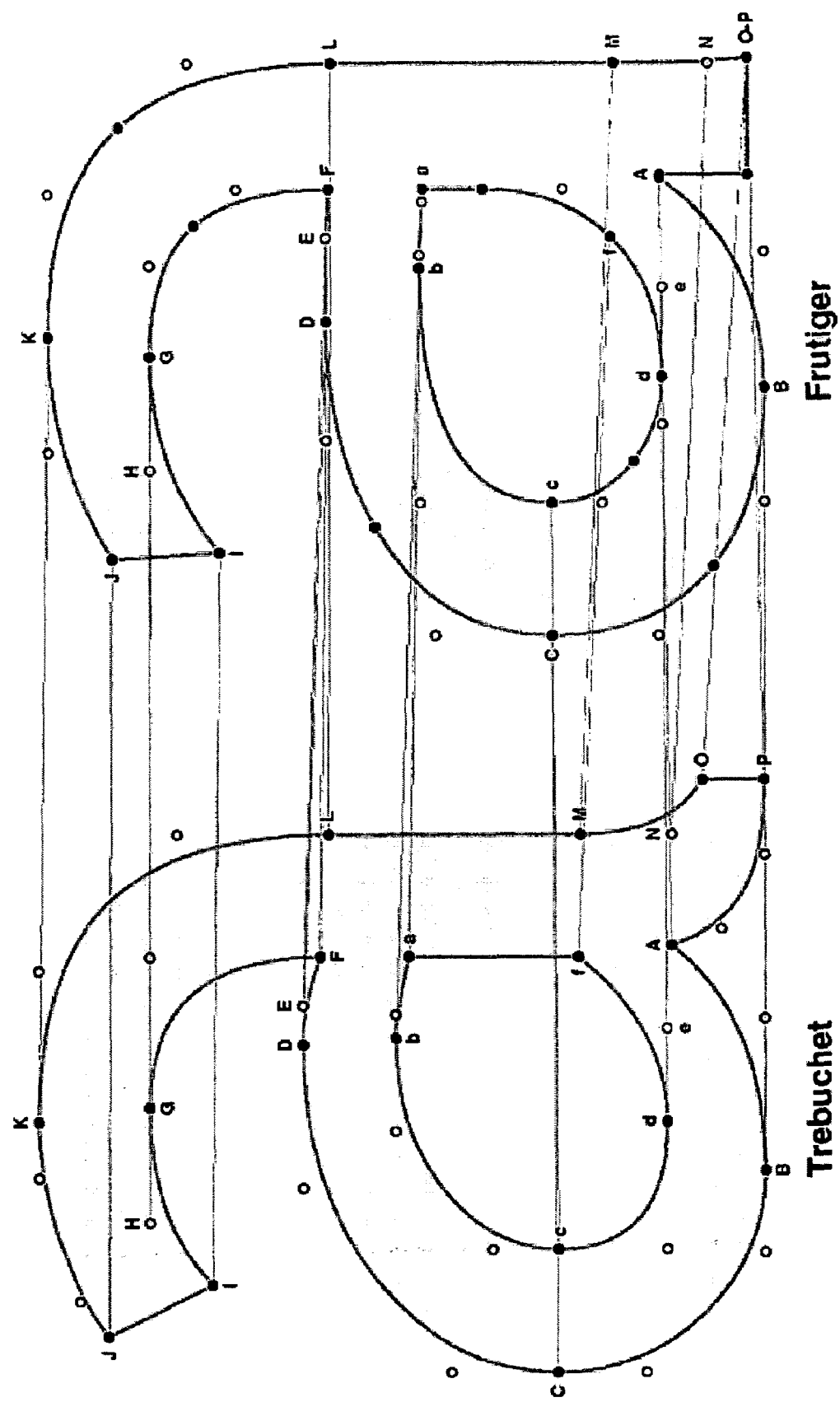
FIG. 10 illustrates a final match between control points for the two characters of FIG. 2 in accordance with the described embodiment.
Figure 11:
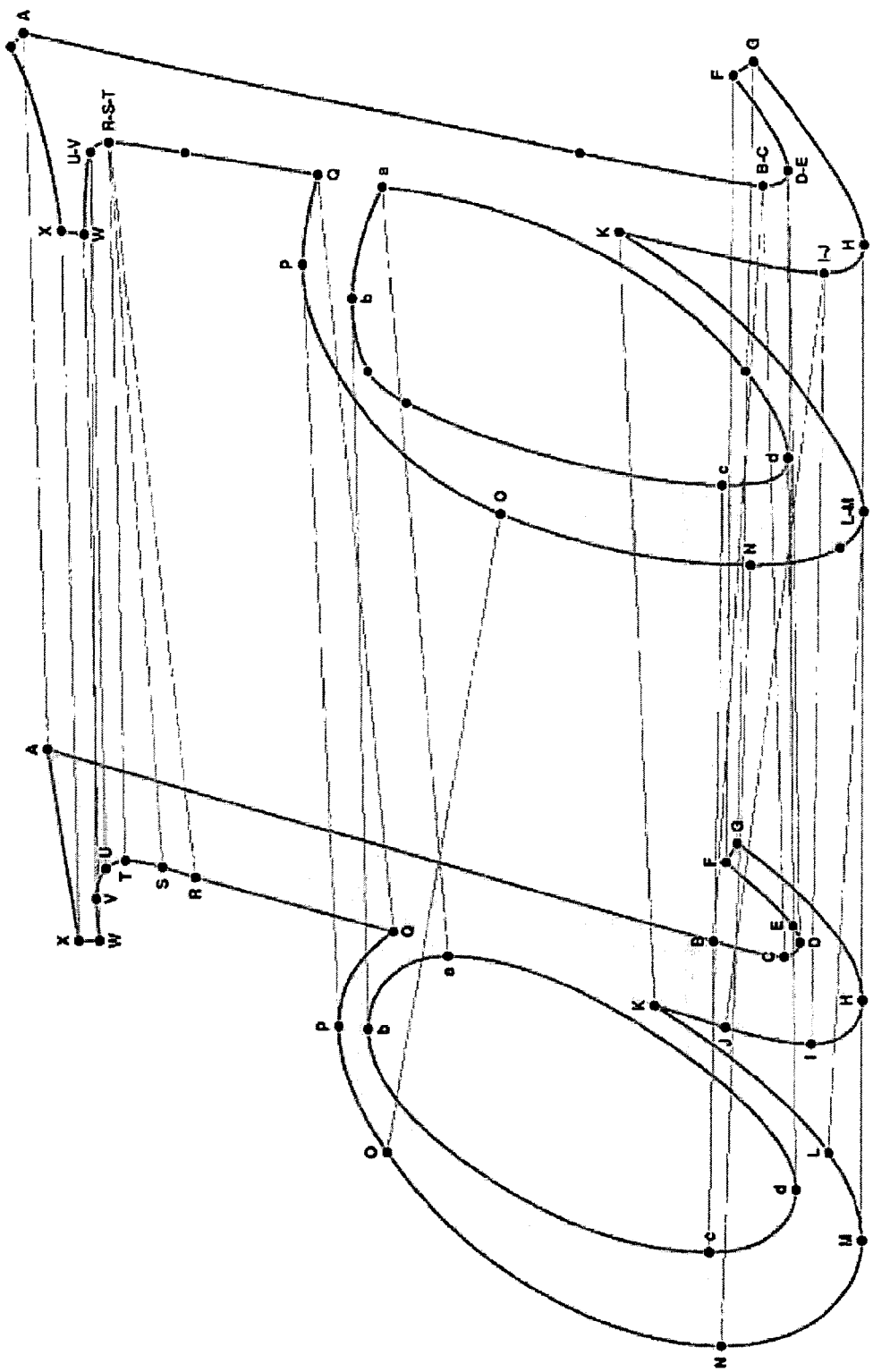
FIG. 11 illustrates a final match for two different characters in accordance with the described embodiment.

FIG. 10 shows the results of this matching algorithm. These heuristics work well for a wide variety of character styles, including roman, bold, and italic characters. A matching for a more complex pair of glyphs is shown in FIG. 11.

Figure 12:
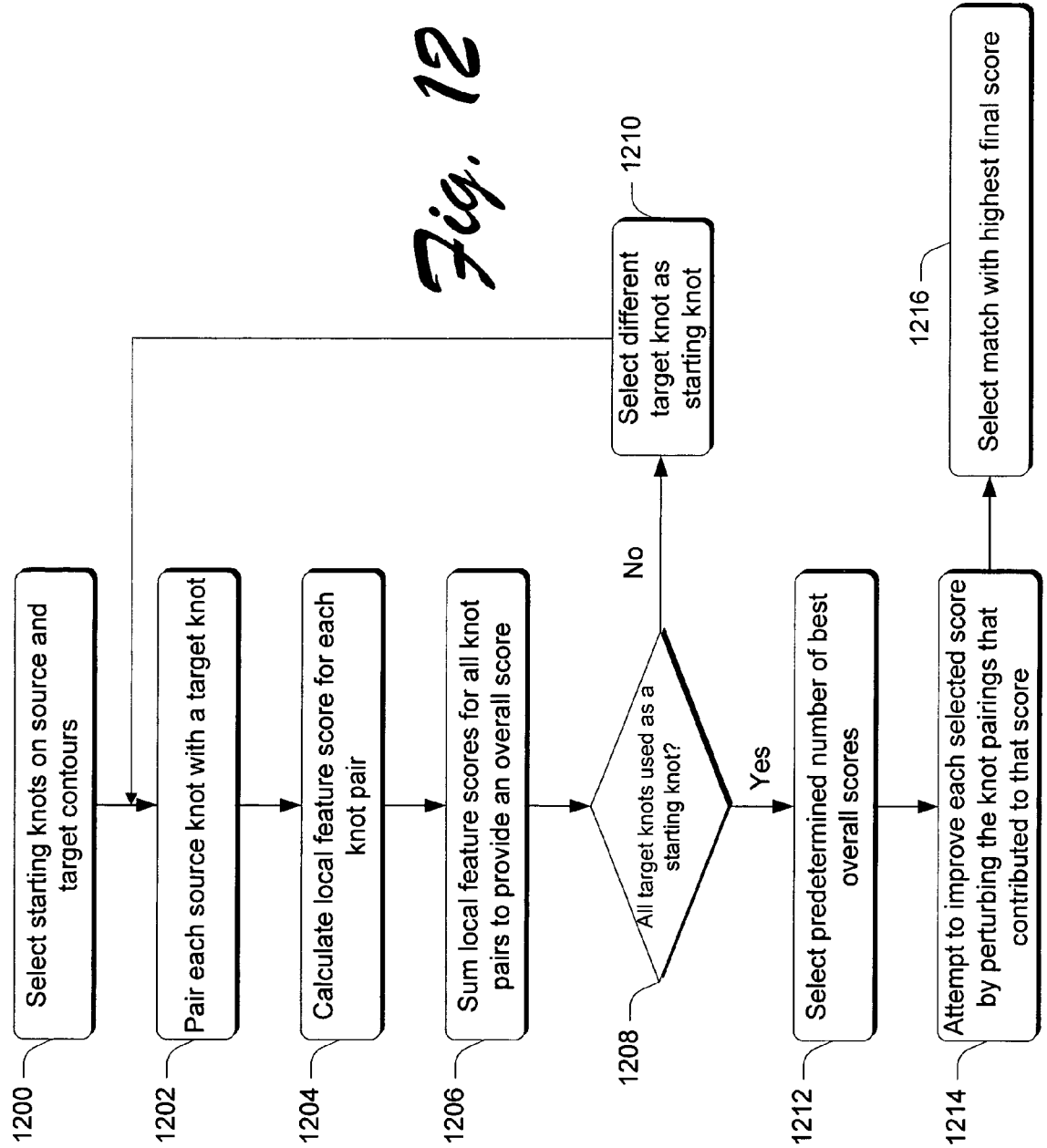
FIG. 12 is a flow diagram that describes steps in a method in accordance with the described embodiment.

FIG. 12 is a flow diagram that describes steps in a matching algorithm in accordance with the described embodiment. The method is advantageously implemented in software. Step 1200 selects starting knots on the source and target contours. Step 1202 pairs each source knot with a target knot, starting at the starting knots and working around the source contour in a predetermined manner. Step 1204 calculates a local feature score for each knot pair. One example of how this can be done is given above. When all of the local feature scores have been calculated for the individual knot pairs, step 1206 sums the local feature scores to provide an overall score that gives an indication of the quality of the overall match. Advantageously, this process is carried out multiple times so that a set of overall scores is generated for different sets of knot pairings.

In the illustrated and described embodiment, each of the target knots is used as a starting knot for a set of knot pairings. Accordingly, step 1208 ascertains whether all of the target knots have been used as a starting knot. If all of the target knots have not been used as a starting knot, step 1210 selects a different target knot as a starting knot (while maintaining the original source starting knot) and returns to step 1202. The result of this step is that a different pair of knots is defined that can generate different local feature scores (step 1204) and a different overall score (step 1206).

Once all of the target knots have been used as a starting knot, step 1212 selects a predetermined number of the best scores (e.g. the five best scores) and step 1214 attempts to improve each selected score by perturbing knot pairings that contributed to that overall score. Once the highest score has been found, step 1216 selects the match with the highest score and uses that match as the basis for transferring hints to the target character.

The above description illustrates but one way of implementing a knot-matching process. It is to be understood that other approaches can be implemented without departing from the spirit and scope of the claimed subject matter.

Hint Translation

Having produced a "best match" between the knots of the source character outline and those of the target character outline, the hints that are associated with the source character can now be translated or transferred from the source character to the target character.

Figure 13:
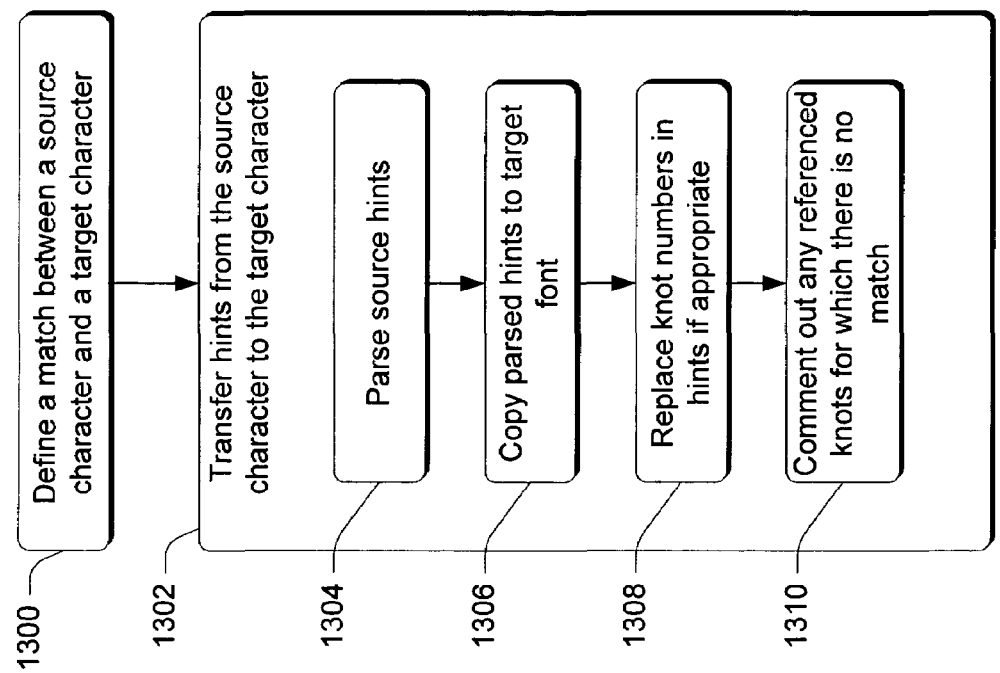
FIG. 13 is a flow diagram that describes steps in a method in accordance with the described embodiment.

FIG. 13 is a flow diagram that describes an exemplary hint transferring process in which VTT Talk hints are transferred from a source character to a target character. It will be appreciated and understood that while the example is given in the context of VTT Talk hints for TrueType hints, it is possible for the methodologies described below to be implemented in connection with other differently defined hints.

Step 1300 defines a match between a source character and a target character. One exemplary way of accomplishing this task is described above in connection with FIG. 12. Once the match is defined, step 1302 transfers hints from the source character to the target character. To transfer the hints in this example, the source font's VTT Talk hints are parsed (step 1304) and copied (step 1306) to the target font. Knot numbers are replaced (step 1308) as appropriate according to the match. If there is not a match for a knot referenced in a particular statement, the source statement is copied unchanged, but is commented out (step 1310) to mark it as a place that may need special attention by a person reviewing the font.

In this manner, hints that were specifically defined for the source character in terms of the source character's knots or control points, are automatically transferred or translated to the target character where the transferred hints now refer specifically to the target character's knots or control points.

CVT Translation

The Control Value Table (CVT) is a central feature of the TrueType hinting mechanism, and no TrueType autohinting scheme would be complete without addressing it.

In VTT Talk, entries of the CVT are used via statements such as:

YLink(14,0,87)

This statement says, in effect, "move knot 0 up or down so that its vertical distance from knot 14 is equal to the value in CVT entry 87."

In the illustrated example, a matching module translates the references to specific knots to their analogues in the new font based upon the matches. In addition, the same CVT entry numbers (e.g. "87") as were used in the original font can still be used, although the values associated with those entry numbers will likely need to be changed. The reason for this is that the old values in the CVT represent distances measured in the source font, which may bear little or no relation to distances in the target font.

A solution for which values to insert into the CVT comes from recognizing that the major reason the CVT is used is to take a set of distances that are approximately the same in the outline, and force them to be exactly the same number of pixels in a rendered bitmap. Since the goal is to provide this consistency while changing the outlines as little as possible, the CVT entry will generally contain some average value that is close to all the distances it is going to be used to constrain. Using this knowledge, we can look at all of the uses of a particular CVT entry to estimate what its value should be.

Figure 14:
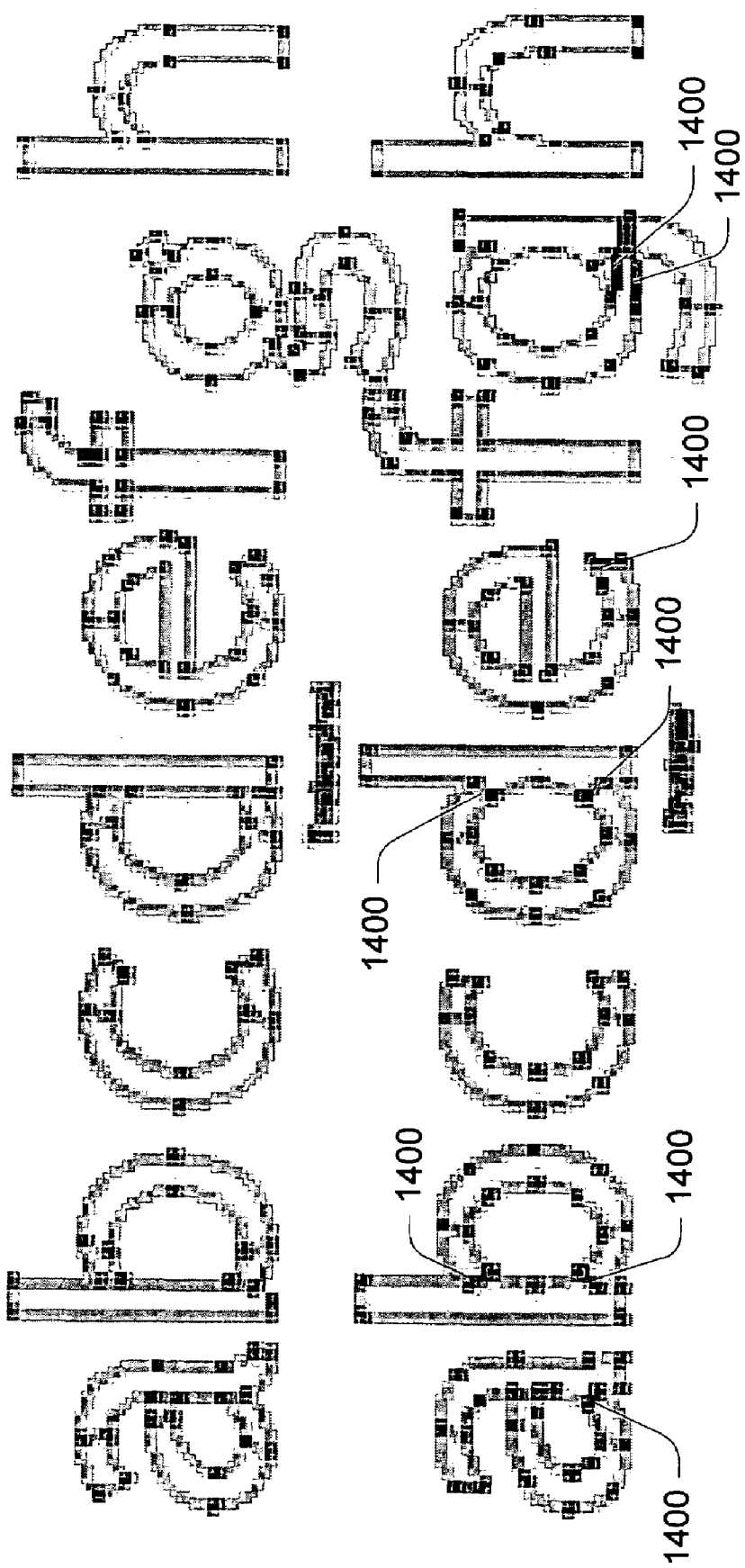
FIG. 14 visually illustrates the outcome of a process in which control value table (CVT) values for one font were transferred to another font.

As an example, consider FIG. 14 and how this works on the 'a' character. The top row shows characters from the font Trebuchet. The typographer hinting this font chose to use CVT entry 87 to represent the height of round, black features in lowercase characters, as indicated by the lines between the control points. Most of the lowercase letters that have round parts reference CVT 87, as indicated in the top row of FIG. 14. The 'a' glyph alone uses entry 87 six times—that is, there are six pairs of knots in the 'a' whose distance is constrained by CVT entry 87. The bottom row shows the font Frutiger, along with the uses of CVT entry 87 as transferred from Trebuchet by a suitably programmed autohinter. Lines 1400 indicate where hints were automatically discarded because the natural distance between these points was too different from the value in the CVT table. Accordingly, hints are disgarded where they appear to be inappropriate for a character of the font to be hinted.

The table immediately below shows the "natural" distances between each of these pairs in the Frutiger font for each of the indicated glyphs.

| Glyph | References to CVT entry 87 |
| --- | --- |
| "a" | 75* 143 143 156 156 164 |
| "b" | 111* 113* 156 156 |
| "c" | 156 156 160 172 |
| "d" | 111* 113* 156 156 |
| "e" | 156 156 193* |
| "f" | 155 156 |
| "g" | 45* 45* 111* 156 156 178 |
| "h" | 156 |

As indicated, one pair of points in the 'a' is 75 units apart vertically in the unhinted outline, another is 143 units, and so on. To determine the overall value to place in the CVT entry, the median of all these individual values is computed, which in this case is 156 units. The starred numbers in the listing indicate those uses of the CVT entry where the natural outline distance differs by more than 20% from the median value. These values are designated as outliers, and the hints corresponding to those points are removed (i.e. commented out) during the translation process, as they usually represent cases where the shape of the target character differs enough from that of the source character that the CVT constraint is inappropriate. These commented-out constraints correspond to the lines designated at 1400. The commented-out hints can be maintained, however, in commented-out form so that a person fine-tuning the results can quickly see where the autohinter disgarded various hints, thereby possibly necessitating manual work in the area.

Note that Trebuchet has a so-called spectacle g, while Frutiger has a multi-story g. In this case, it is likely that two the forms of the 'g' require entirely different hinting strategies, since many of the hints of the source 'g' are simply not appropriate for the target character shape. These inappropriate hints are automatically discarded by the outlier mechanism.

It will be appreciated that the CVT has a hierarchical aspect in the sense that entries in the table can refer to other entries whose associated values might be used in certain circumstances. For example, one CVT entry might specify a width value to use above a certain point size, but for point sizes below the certain point size, a different CVT entry is to be used to constrain the width. The above translation of CVT values takes into account these dependencies when the table values are changed.

Conditional Hint Specification

In the above discussion, the hints that are being transferred have a characteristic in that they are essentially maintained through all sizes of fonts. There are other hints, however, that are specific to a given size or range of sizes. For example, a typographer may have physically altered the hints of a character at a certain size to make it look better. That is, at a certain size a certain condition may occur that has an undesirable effect on the rendered character, e.g. the character may have a portion that closes up undesirably. In this embodiment, one or more conditions can be defined that result in a certain hint being applied to the character if the condition is satisfied. Advantageously, these conditionally-specified hints can be transferred from a source character to a target character or from a source font to a target font. Thus, if the same condition occurs in the automatically hinted target font, the conditionally-specified hint can be applied in the target character to eliminate the undesirable condition.

Effective Removal of Control Points

There are circumstances where certain characters have subtleties in the outlines that look good at higher resolutions, but do not look good at lower resolutions. To deal with this situation, there is a way to manipulate the control points of the character so that the subject control point(s) that give rise to the subtlety are effectively removed. This is done by programmatically relocating the control point so that it lies on top of another control point. By doing this, the control point is effectively, but not actually, removed. Advantageously, in the described embodiment, these effectively removed control points are transferred to the target character so that similar undesirable subtleties in the target character are effectively eliminated as well.

ClearType

The above described methods are applicable to ClearType hinting. ClearType is a method of rendering fonts that takes advantage of special properties of LCD screens (such as laptops or PDAs). The TrueType rendering mechanism is unchanged, but for best results, the hinter should alter his or her strategy for hinting the character. Generally speaking, due to increased effective horizontal resolution that ClearType gives, fonts to be displayed with ClearType need much less hinting in the x-direction than fonts intended for CRT display. The above-describe hinting strategy is employable as for TrueType fonts that employ a ClearType strategy.

Results

In an example application two TrueType fonts were taken as input: a source font, from which the hints are transferred; and a target font, which is automatically hinted by an application program executing on a computerized hinting system. The application program took under a minute to match the outlines, translate the hints, and create the new CVT for a 256-character font.

Once the target font is hinted, however, it should still be reviewed by hand and corrected by an experienced typographer. Even minor errors in the translated hints or CVT can take a considerable amount of time to identify and correct, so the translation should be as accurate as possible in order to be useful.

Figure 15:
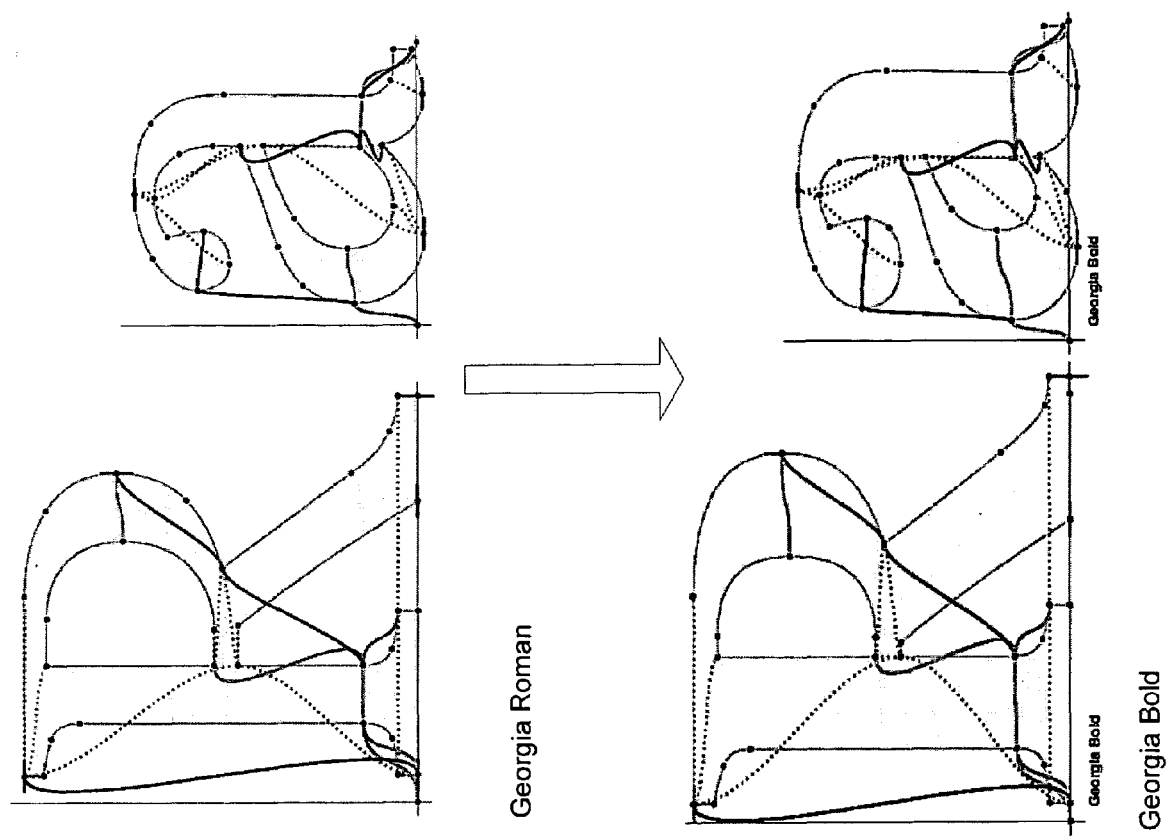
FIGS. 15–19 visually illustrate hints transferred from one font to another.
Figure 16:
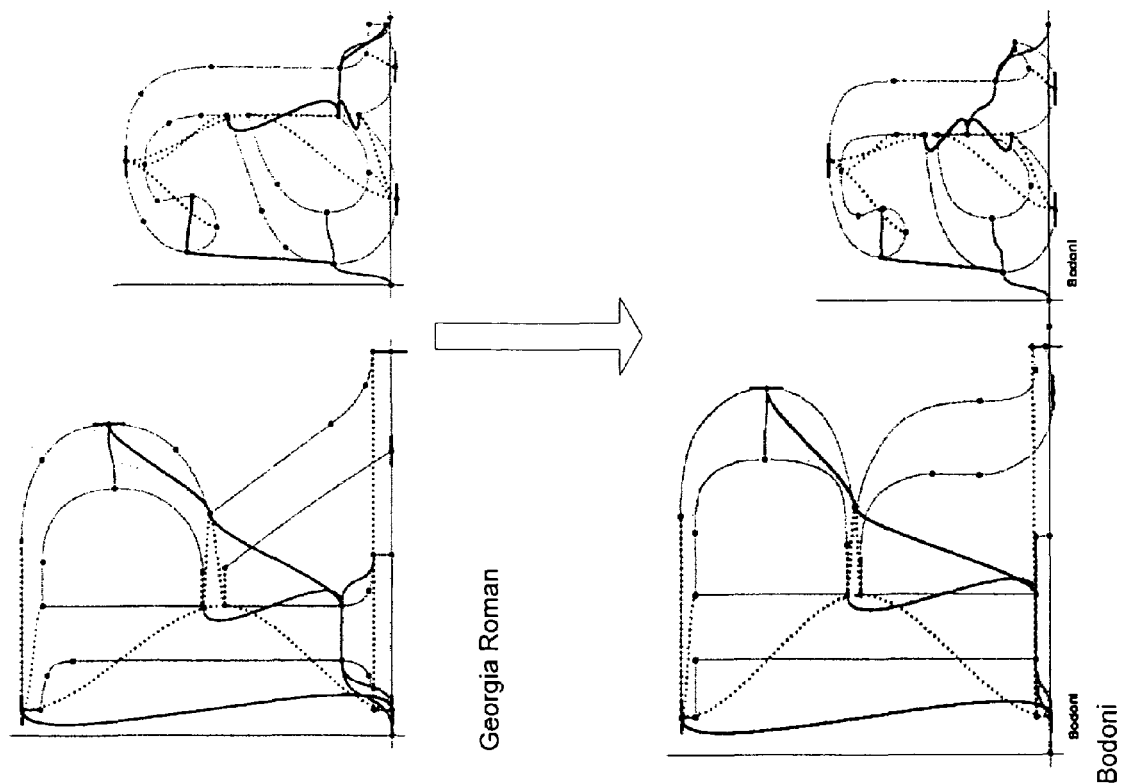
Figure 17:
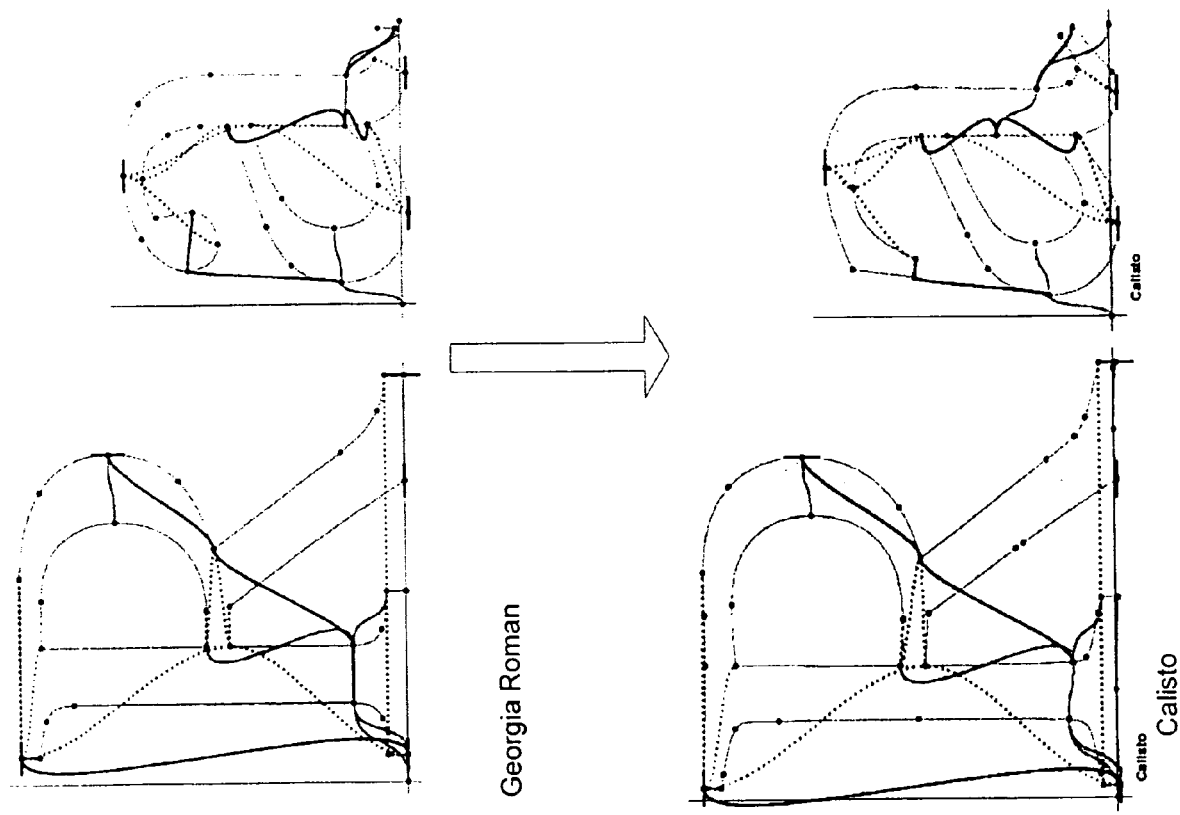
Figure 18:
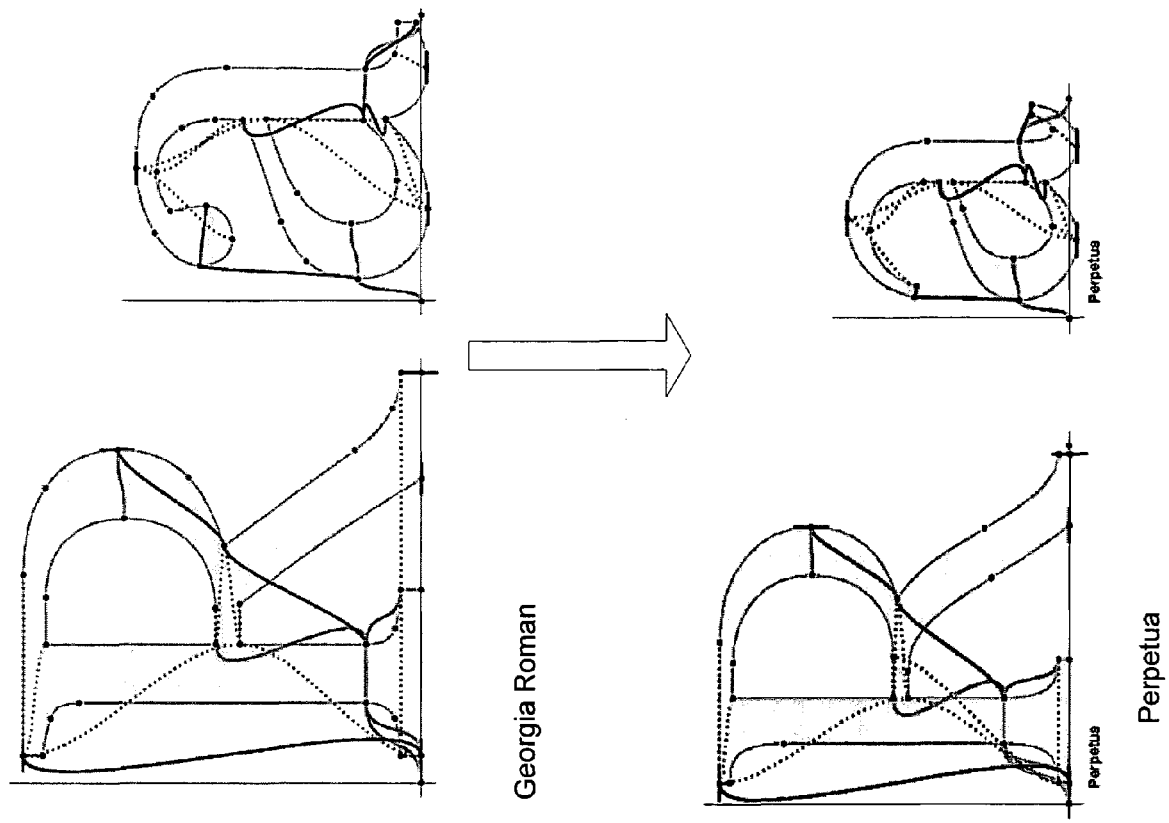
Figure 19:
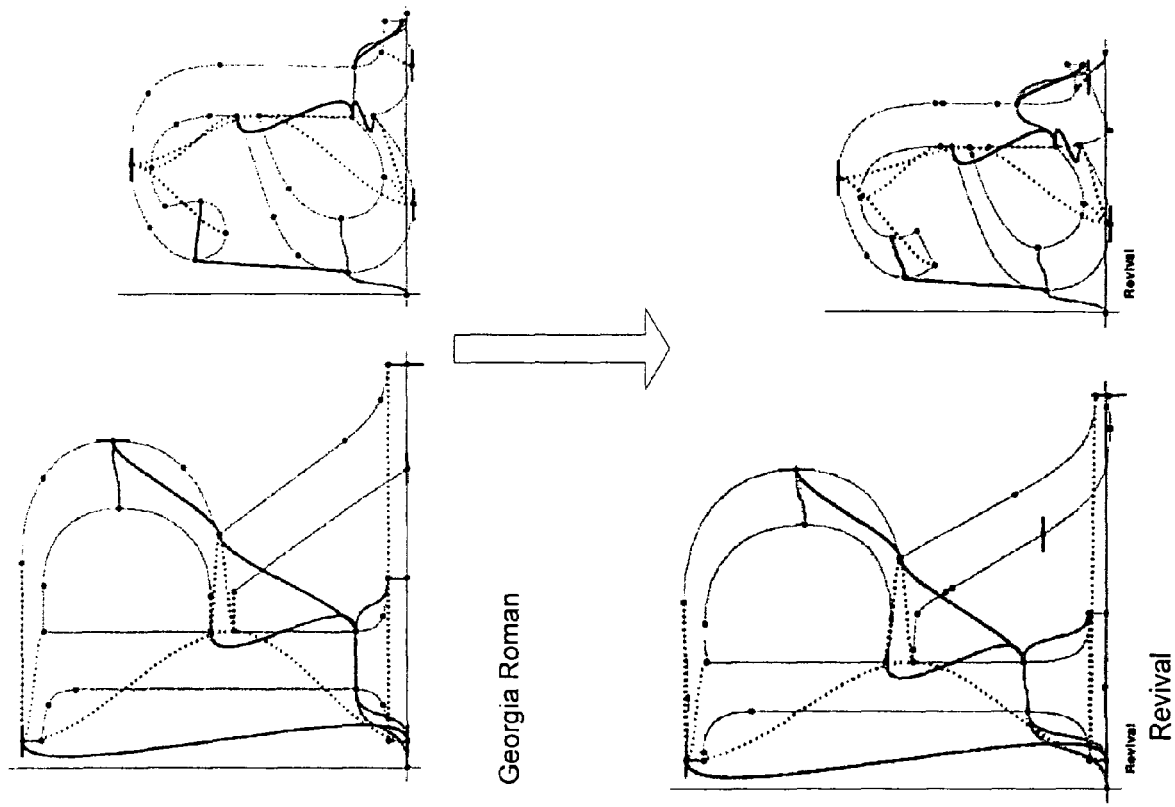

For the explanation that follows, reference is made to FIGS. 15–19, each of which visually demonstrates hints that are transferred from a fully hinted Georgia Roman font to an unhinted different font. For example, FIG. 15 shows hints transferred from Georgia Roman to Georgia Bold; FIG. 16 shows hints transferred from Georgia Roman to Bodoni; FIG. 17 shows hints transferred from Georgia Roman to Calisto; FIG. 18 shows hints transferred from Georgia Roman to Perpetua; FIG. 19 shows hints transferred from Georgia Roman to Revival.

FIGS. 20 and 21 compare the unhinted versions of Sylfaen Sans Bold and Georgia Bold, respectively, to the versions hinted automatically, at 16, 17, and 19 ppem, the most commonly used on-screen sizes. In these examples it is clear that most of the objectionable artifacts in the unhinted versions have already been corrected by the automatic hinting. Note, for instance, the improved 'O' shapes and the much more uniform stem weights in both fonts. Still, the autohinted versions are not perfect; note for instance where the bowl of the Georgia Bold 'b' has narrowed unacceptably, especially at lower sizes. Imperfections like these will need to be corrected by hand.

The method described above was evaluated by using the application program to transfer hints between three pairs of fonts within the same family (Sylfaen Sans Bold from Sylfaen Sans, Georgia Bold from Georgia, and Georgia Bold Italic from Georgia Italic) as well as four target fonts from a source font of a different font family (Bodoni, Calisto, Perpetua, and Revival—all from Georgia). The table immediately below summarizes the results of these tests.

| Source Font | Target Font | Success rate (%) | Review and clean up (min.) | Manual Hinting (min.) | Savings (%) |
|---|---|---|---|---|---|
| Sylfaen Sans | Sylfaen Sans Bold | 84% | 5.9 | 9.4 | 37% |
| Georgia Italic | Georgia Bold Italic | 86% | 6.7 | 7.9 | 15% |
| Georgia Roman | Georgia Bold | 93% | 4.6 | 7.1 | 35% |
| Georgia Roman | Bodoni | 78% | 3.3 | 3.3 | 0% |
| Georgia Roman | Calisto | 74% | 3.0 | 4.3 | 30% |
| Georgia Roman | Perpetua | 76% | 1.2 | 2.7 | 56% |
| Georgia Roman | Revival | 82% | 1.3 | 2.3 | 43% |

In each case, just the alphanumeric glyphs were hinted. The "success rate" column gives the percentage of 62 glyphs in which the transferred hints basically worked. More specifically, for a "successful" glyph, the overall appearance of the glyph conformed to the original outline at high sizes (38 ppem and above) without any stretching or distortion, whereas below 38 ppem there might be some cleaning up to do, but no major reshaping or rethinking of the hints. If a glyph did not conform to its original outline at high sizes or required major reshaping at low sizes, then it was considered "unsuccessful."

As can be seen from the table, the hinter had a fairly high success rate by this measure, especially when hinting characters within the same font family. The next column (Review and cleanup) gives an estimate of the number of minutes required for an experienced typographer to review the results of the autohinter and clean up any problems in the transferred hints. The figures in this column were estimated by performing this process on some 3 to 11 representative glyphs in the target font. These same glyphs were also manually hinted by the same typographer and the times required reported in the following column. Finally, the right-most column provides an estimate of the overall time savings provided by the example-based hinter.

Note that the very high success rate of the hinter translates into a more moderate overall time savings, since even a perfectly-hinted font requires time to review, and since a few small problems in the hints can be time-consuming to correct. Still, these savings are significant, considering that a full font of 256 characters can take on the order of 20–40 hours for a skilled professional to produce.

CONCLUSION

Methods and systems for automatically hinting TrueType fonts have been described. The inventive approaches use an existing, fully-hinted font as a template, thereby allowing the hints of one font to be transferred to another. This translation process includes estimation of the control value table (CVT) entries that are used to unify feature sizes across a font. Utility is derived from the described matching algorithm from not only its simplicity, but from its ability to be applied to and work well for a wide variety of character shapes, including serifed and italic fonts.

An important advantage of the described approach over previous autohinters is that the described approach preserves the hand-crafted hinting strategy, built by a professional typographer, in the newly hinted font. Thus, the translated hints provide an excellent starting point and generally require only minor cleanup and adjustment.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of providing a hinted font comprising:
   selecting a first TrueType font that has been hinted with hints that define constraints between control points associated with individual characters of the font;
   identifying individual characters of a second TrueType font that correspond to individual characters of the first TrueType font, the second TrueType font being different from the first TrueType font, individual characters of the second TrueType font being unhinted; and
   transferring hints from characters of the first TrueType font to individual corresponding characters of the second TrueType font.

2. The method of claim 1, wherein the first TrueType font comprises a font that has control-point level hints attached to it and said transferring of the hints comprises transferring the control-point level hints from characters of the first TrueType font to control-point level hints in characters of the second TrueType font.

3. The method of claim 2, wherein at least one control point of the first TrueType font has been programmatically relocated to lie on top of another control point of the first TrueType font.

4. The method of claim 1, wherein said selecting comprises selecting the first TrueType font from among a number of different fully hinted TrueType fonts.

5. The method of claim 1, wherein said selecting comprises automatically selecting the first TrueType font from among a number of different fully hinted TrueType fonts that are resident in a library.

6. The method of claim 1, wherein said selecting comprises further selecting a TrueType font that is different from the first and second TrueType fonts, and transferring hints from characters of the selected different TrueType font to individual characters of the second TrueType font.

7. The method of claim 1, wherein said identifying comprises matching one or more contours on a character of the first TrueType font with one or more contours of a character of the second TrueType font.

8. The method of claim 7, further comprising after said matching, pairing individual points associated with a contour of the character of the first TrueType font with individual respective points associated with a corresponding contour of the character of the second TrueType font.

9. The method of claim 8, wherein said transferring comprises transferring hints that are defined in terms of the individual points associated with the contour of the character of the first TrueType font.

10. The method of claim 8, wherein said transferring comprises transferring hints that are defined in terms of individual points associated with the contour of the character of the first TrueType font by changing the definition of the hints to refer to individual points associated with the contour of the character of the second TrueType font.

11. The method of claim 8, wherein said pairing of the individual points defines one set of multiple point pairs, and further comprising defining multiple sets of point pairs, each set of point pairs comprising different pairings of points.

12. The method of claim 11 further comprising:
   calculating a score for each set of point pairs;
   selecting a set of point pairs based upon the calculated score;
   said transferring comprising using the selected set of point pairs as a basis for transferring the hints.

13. The method of claim 12, wherein said calculating comprises:
   for each individual pair of points, calculating an individual local score; and
   summing the individual local scores for all of the individual pairs of points to provide an overall score for each set of point pairs;
   said selecting of the set of point pairs comprising selecting the set with the best overall score.

14. One or more computer-readable media having computer-readable instructions thereon which, when executed by a computer, implement the method of claim 1.

15. The method of claim 1, wherein said transferring comprises transferring one or more conditionally-specified hints.

16. The method of claim 1 further comprising discarding a hint where it appears inappropriate for a character of the second TrueType font.

17. The method of claim 1 further comprising defining at least one conditionally specified hint associated with a character of the first TrueType font, and transferring said conditionally specified hint if a condition associated with the conditionally specified hint is met by a corresponding character of the second TrueType font.

18. A method of providing a hinted TrueType font comprising:
   providing a source character from a fully hinted TrueType font from which hints are to be transferred, the source character having multiple control points that are constrained by the hints;
   providing a target character from a different TrueType font to which hints from the source character are to be transferred, the target character having control points that will be constrained by the transferred hints; and transferring hints associated with the source character and that refer to control points on the source character to hints associated with the target character and that refer to control points on the target character.

19. The method of claim 18, wherein said transferring comprises modifying control point references contained in the hints.

20. The method of claim 18, wherein said transferring comprises modifying one or more values contained in a table that is referenced by at least one hint.

21. The method of claim 18, wherein said transferring comprises pairing individual control points associated with the source character with individual control points associated with the target character to define a set of multiple pairs of control points, and, for each pair of control points, calculating a score that characterizes the pair of control points.

22. The method of claim 21, wherein the score characterizes the desirability of a match between the control points.

23. The method of claim 22, wherein the desirability of the match is a function of incoming/outgoing directions that are associated with each control point.

24. The method of claim 22, wherein the desirability of the match is a function of a control point constituting a local minimum or maximum.

25. The method of claim 22, wherein the desirability of the match is a function of incoming/outgoing lines associated with the control points.

26. The method of claim 22, wherein the desirability of the match considers whether each control point of a pair falls into one of a plurality of common bands that are defined for each character.

27. The method of claim 21, wherein said transferring comprises:
  defining multiple sets of multiple pairs of control points;
  calculating a score for each pair of control points for each of the multiple sets,
  summing individual control point pair scores for each set of multiple pairs of control points to provide an overall score;
  selecting a set of multiple pairs of control points based upon the overall score; and
  transferring the hints using the selected set of multiple pairs of control points as a basis for said transferring.

28. The method of claim 27, wherein the control points that comprise the multiple pairs comprise control points that are located on a contour associated with the individual character.

29. The method of claim 28, wherein the defining of the multiple sets of multiple pairs comprises, for each set:
  selecting a control point on the source character as a starting point;
  selecting a control point on the target character as a starting point;
  pairing the two selected points;
  selecting a different control point on the source character and pairing it with a selected control point on the target character and continuing to select and pair control points on the source character until there are no unpaired control points on the source character.

30. The method of claim 29, wherein each set of the multiple sets of multiples pairs comprises different pairings of selected points.

31. One or more computer-readable media having computer-readable instructions thereon which, when executed by a computer, implement the method of claim 18.

32. A method of providing a hinted font comprising:
  defining hints for a glyph of a first font, the hints being defined by one or more statements that contain multiple values that define constraints for the glyph, at least one of the values referencing a table entry that corresponds to a table value that is used to constrain the glyph;
  establishing an association between the glyph of the first font and a glyph of a second font, the second font being different from the first font; and
  translating the one or more statements so that the one or more statements now pertain to and define constraints for the glyph of the second font.

33. The method of claim 32, wherein the first and second fonts comprise TrueType fonts.

34. The method of claim 32, wherein said translating comprises manipulating at least some of the values of the one or more statements.

35. The method of claim 32, wherein some of the values pertain to specific points on the glyph of the first font, and:
  said establishing comprises establishing an association between the specific points on the glyph of the first font and specific points on the glyph of the second font; and
  said translating comprises changing at least some of the values of the individual statements to correspond to the specific points on the glyph of the second font.

36. The method of claim 35, wherein said changing of at least some values comprises changing a table value.

37. The method of claim 36, wherein said changing of the table value comprises:
  determining a plurality of natural distances in the glyph of the second font, the natural distances being defined relative to specific points in the glyph of the second font that are to be constrained by the table value; and
  calculating a new table value for the table entry as a function of the natural distances.

38. An automated hinting system programmed with instructions which execute to implement the method of claim 32.

39. An automated hinting system comprising:
  a computer-readable medium;
  one or more processors;
  computer-readable instructions resident in the computer-readable medium which, when executed by the one or more processors, cause the automated hinting system to:
    select a first TrueType font that has been hinted with hints that define constraints between control points on individual characters of the font;
    identify individual characters of a second TrueType font that correspond to individual characters of the first TrueType font, the second TrueType font being different from the first TrueType font, individual characters of the second TrueType font being unhinted; and
    transfer hints from characters of the first TrueType font to individual corresponding characters of the second TrueType font.

40. The automated hinting system of claim 39, wherein the automated hinting system identifies the individual characters by matching one or more contours on a character of the first TrueType font with one or more contours of a character of the second TrueType font.

41. The automated hinting system of claim 39, wherein the automated hinting system transfers the hints by pairing individual control points associated with characters and transferring hints that are defined in terms of the individual control points, the transferring comprising changing a hint definition to refer to one or more control points associated with the character to which the hint is transferred.

42. The automated hinting system of claim 39, wherein the automated hinting system transfers the hints by pairing individual control points associated with characters and transferring hints that are defined in terms of the individual control points.

* * * * *